(12) United States Patent
Bingham et al.

(10) Patent No.: US 11,073,500 B2
(45) Date of Patent: Jul. 27, 2021

(54) SYSTEMS AND METHODS FOR AUTOMATIC ALIGNMENT AND FOCUSING OF LIGHT IN LASER ULTRASOUND TESTING

(71) Applicants: The Boeing Company, Chicago, IL (US); University of Washington, Seattle, WA (US)

(72) Inventors: Jill P. Bingham, Seattle, WA (US); Gary E. Georgeson, Tacoma, WA (US); William P. Motzer, Charleston, SC (US); Alan F. Stewart, Seattle, WA (US); Matthew O'Donnell, Seattle, WA (US); Ivan Pelivanov, Seattle, WA (US)

(73) Assignees: The Boeing Company, Chicago, IL (US); University of Washington, Seattle, WA (US)

( * ) Notice: Subject to any disclaimer, the term of this patent is extended or adjusted under 35 U.S.C. 154(b) by 259 days.

(21) Appl. No.: 16/183,229

(22) Filed: Nov. 7, 2018

(65) Prior Publication Data
US 2020/0141908 A1    May 7, 2020

(51) Int. Cl.
*G01N 29/22*    (2006.01)
*G01N 29/24*    (2006.01)
*G01N 29/265*    (2006.01)
*G01N 21/17*    (2006.01)
*G01N 29/11*    (2006.01)

(52) U.S. Cl.
CPC ..... *G01N 29/2418* (2013.01); *G01N 21/1702* (2013.01); *G01N 29/11* (2013.01); *G01N 29/225* (2013.01); *G01N 29/265* (2013.01); *G01N 2021/1706* (2013.01); *G01N 2291/0231* (2013.01); *G01N 2291/2694* (2013.01)

(58) Field of Classification Search
CPC ............ G01N 29/2418; G01N 29/265; G01N 2021/1706; G01N 2291/2694; G01N 21/1702; G01N 2291/106; G01N 29/225; G01N 2291/0231; G01S 15/06; G01B 21/042; G01B 21/16; Y10S 901/09
See application file for complete search history.

(56) References Cited

U.S. PATENT DOCUMENTS

| | | | |
|---|---|---|---|
| 6,041,020 A * | 3/2000 | Caron | G01H 9/008 356/340 |
| 6,667,798 B1 | 12/2003 | Markendorf et al. | |
| 7,023,536 B2 | 4/2006 | Zhang et al. | |
| 7,312,861 B2 | 12/2007 | Loen | |

(Continued)

*Primary Examiner* — Brandi N Hopkins
(74) *Attorney, Agent, or Firm* — Walters & Wasylyna LLC

(57) ABSTRACT

A method for testing a structure using laser ultrasound includes steps of: (1) directing positioning light on a surface of the structure; (2) determining a spatial location and a spatial orientation of the surface from an evaluation of the positioning light reflected back from the surface; (3) directing pump light onto the surface to generate ultrasonic waves in the structure; (4) selectively locating a probe-light focal point of probe light on the surface, based on the spatial location determined for the surface; (5) selectively angularly orienting the probe light normal to the surface, based on the spatial orientation determined for the surface; and (6) directing the probe light onto the surface to detect a response to the ultrasonic waves.

45 Claims, 13 Drawing Sheets

(56) References Cited

U.S. PATENT DOCUMENTS

| | | | |
|---|---|---|---|
| 8,332,165 B1 | 12/2012 | Tat et al. | |
| 9,164,066 B1 | 10/2015 | Bossi et al. | |
| 9,267,878 B2* | 2/2016 | Uchida | G01N 21/1702 |
| 9,310,482 B2* | 4/2016 | Rosenberg | G01S 15/06 |
| 9,404,898 B1 | 8/2016 | Georgeson et al. | |
| 9,575,033 B1 | 2/2017 | Georgeson et al. | |
| 9,576,862 B2* | 2/2017 | Murray | G01N 21/9501 |
| 9,625,423 B2 | 4/2017 | Bossi et al. | |
| 2017/0176321 A1 | 6/2017 | Georgeson et al. | |
| 2017/0176322 A1 | 6/2017 | Motzer et al. | |
| 2017/0176393 A1 | 6/2017 | O'Donnell et al. | |
| 2017/0248551 A1 | 8/2017 | Pelivanov et al. | |

* cited by examiner

SYSTEMS AND METHODS FOR AUTOMATIC ALIGNMENT AND FOCUSING OF LIGHT IN LASER ULTRASOUND TESTING This invention was made with government support under NASA ACC-202C21 awarded by NASA. The government has certain rights in this invention.

FIELD

The present disclosure is generally related to nondestructive inspection and, more particularly, to systems and methods for automatically aligning and focusing light, such as during nondestructive inspection using laser ultrasound.

BACKGROUND

Article fabrication often includes inspection of components used to form the article or inspection of the article itself. Such articles may include vehicles, such as aircraft, stand-alone structures, consumer products, and a wide range of other items. Inspection is typically performed to determine whether a component has appropriate parameters and properties for a desired function and performance of the article. Additionally, individual components and/or manufactured articles may be inspected as part of normal maintenance. Nondestructive inspection is a common inspection method used to evaluate the properties of a component without altering the ability of that component to be used for its desired function. Examples of nondestructive inspection include ultrasound testing, eddy current testing, x-ray testing, and visual inspections.

Ultrasound testing, or ultrasonic testing, is an example of nondestructive testing that uses transducers to generate and detect acoustic waves in a test object and that generates data characterizing the test object, based on a response to the acoustic waves. Acoustic wave energy is coupled to the test object in some manner. The transducer may be placed in physical contact with a surface of the test object during testing. Alternatively, the transducer may be held at a standoff distance from the surface and is acoustically coupled with the surface by a coupling medium (e.g., a liquid, gel, or elastic couplant) that enables sufficient transfer of acoustic energy. However, in some circumstances, physical contact or use of couplants between the transducer and the test object may be difficult, complex, or otherwise undesirable. Therefore, there is a need for a way to perform nondestructive testing without requiring a transducer to be coupled to a test object.

Laser ultrasound testing, or laser ultrasonic testing, is an example of nondestructive inspection that uses light to generate ultrasonic waves in the test object and detect a response to the ultrasonic waves and that generates data characterizing the test object, based on the response to the ultrasonic waves. Laser ultrasound testing overcomes the difficulties and complexities of coupling a transducer to a test object, either directly or through a couplant, by enabling inspection of the test object without requiring physical contact with the test object. However, the size, weight, and cost of high-energy laser systems that are typically used for laser ultrasound testing may be impractical in many circumstances. Low-energy laser systems overcome these issues. However, in order for usable data to be generated, such low-energy systems typically require relatively precise positioning of an optical head that is configured to transmit and receive light relative to a surface of the test object. Selective positioning of the optical head may be used to maintain normality of the light relative to the surface, to set a focal point of the light relative to the surface, to control a standoff distance between an output of the optical head that emits the light and the surface, and/or to control a spot size of the light on the surface. However, in some circumstances, properly positioning the optical head as the light moves over the surface may be difficult and slow, for example, requiring complex mechanical or laser control mechanisms, discrete numerical control programming, and/or reliance on pre-generated three-dimensional models of the test object, which may miss local variations in the surface and may cause misalignment and/or incorrect standoff of the light. Therefore, there is a need to simplify and speed up the positioning control of light during laser ultrasound testing.

Accordingly, those skilled in the art continue with research and development efforts in the field of laser ultrasound testing and, as such, systems and methods, intended to address the above-identified concerns, would find utility.

SUMMARY

The following is a non-exhaustive list of examples, which may or may not be claimed, of the subject matter according to the present disclosure.

In an example, a disclosed method for testing a structure using laser ultrasound includes steps of: (1) directing positioning light on a surface of the structure; (2) determining a spatial location and a spatial orientation of the surface from an evaluation of the positioning light reflected back from the surface; (3) directing pump light onto the surface to generate ultrasonic waves in the structure; (4) selectively locating a probe-light focal point of probe light on the surface, based on the spatial location determined for the surface; (5) selectively angularly orienting the probe light normal to the surface, based on the spatial orientation determined for the surface; and (6) directing the probe light onto the surface to detect a response to the ultrasonic waves.

In another example, method for testing a structure using laser ultrasound includes steps of: (1) directing positioning light on a surface of the structure; (2) determining a spatial location and a spatial orientation of the surface from an evaluation of the positioning light reflected back from the surface; (3) selectively angularly orienting pump light at a predetermined angular orientation relative to the surface, based on the spatial orientation determined for the surface; (5) directing the pump light onto the surface to form a pump-light spot having a predetermined pump-light spot size, based on the spatial location determined for the surface; (6) selectively locating a probe-light focal point of probe light on the surface, based on the spatial location determined for the surface; (7) selectively angularly orienting the probe light normal to the surface, based on the spatial orientation determined for the surface; (8) directing the probe light onto the surface; (9) generating ultrasonic waves in the structure with the pump light; and (10) detecting a response to the ultrasonic waves with the probe light.

In an example, a disclosed system for testing a structure using laser ultrasound includes a positioning sensor configured to transmit positioning light on a surface of the structure and to receive a portion of the positioning light reflected back from the surface. A spatial location and a spatial orientation of the surface are determined, based on an evaluation of the portion of the positioning light reflected back from the surface. The system further includes a measuring head configured to transmit pump light and probe light onto the surface and to receive a portion of the probe light reflected back from the surface. The pump light generates ultrasonic waves in the structure and the probe light detects a response to the ultrasonic waves. The system also includes a positioning mechanism configured to selectively locate a probe-light focal point of the probe light on the surface, based on the spatial location determined for the surface, and selectively angularly orient the probe light normal to the surface, based on the spatial orientation determined for the surface.

In another example, system for testing a structure using laser ultrasound includes a positioning sensor configured to transmit positioning light on a surface of the structure and to receive a portion of the positioning light reflected back from the surface. A spatial location and a spatial orientation of the surface are determined, based on an evaluation of the portion of the positioning light reflected back from the surface. The system further includes a measuring head configured to transmit pump light and probe light onto the surface and to receive a portion of the probe light reflected back from the surface. The pump light generates ultrasonic waves in the structure and the probe light detects a response to the ultrasonic waves. The system also includes a positioning mechanism (134) configured to selectively angularly orient the pump light at a predetermined angular orientation relative to the surface, based on the spatial orientation determined for the surface. The pump light defines a pump-light spot on the surface having a predetermined pump-light spot size. The positioning mechanism further configured selectively locate a probe-light focal point of the probe light on the surface, based on the spatial location determined for the surface, and selectively angularly orient the probe light normal to the surface, based on the spatial orientation determined for the surface.

Other examples of the systems and methods disclosed herein will become apparent from the following detailed description, the accompanying drawings and the appended claims.

DETAILED DESCRIPTION

Figure 1:
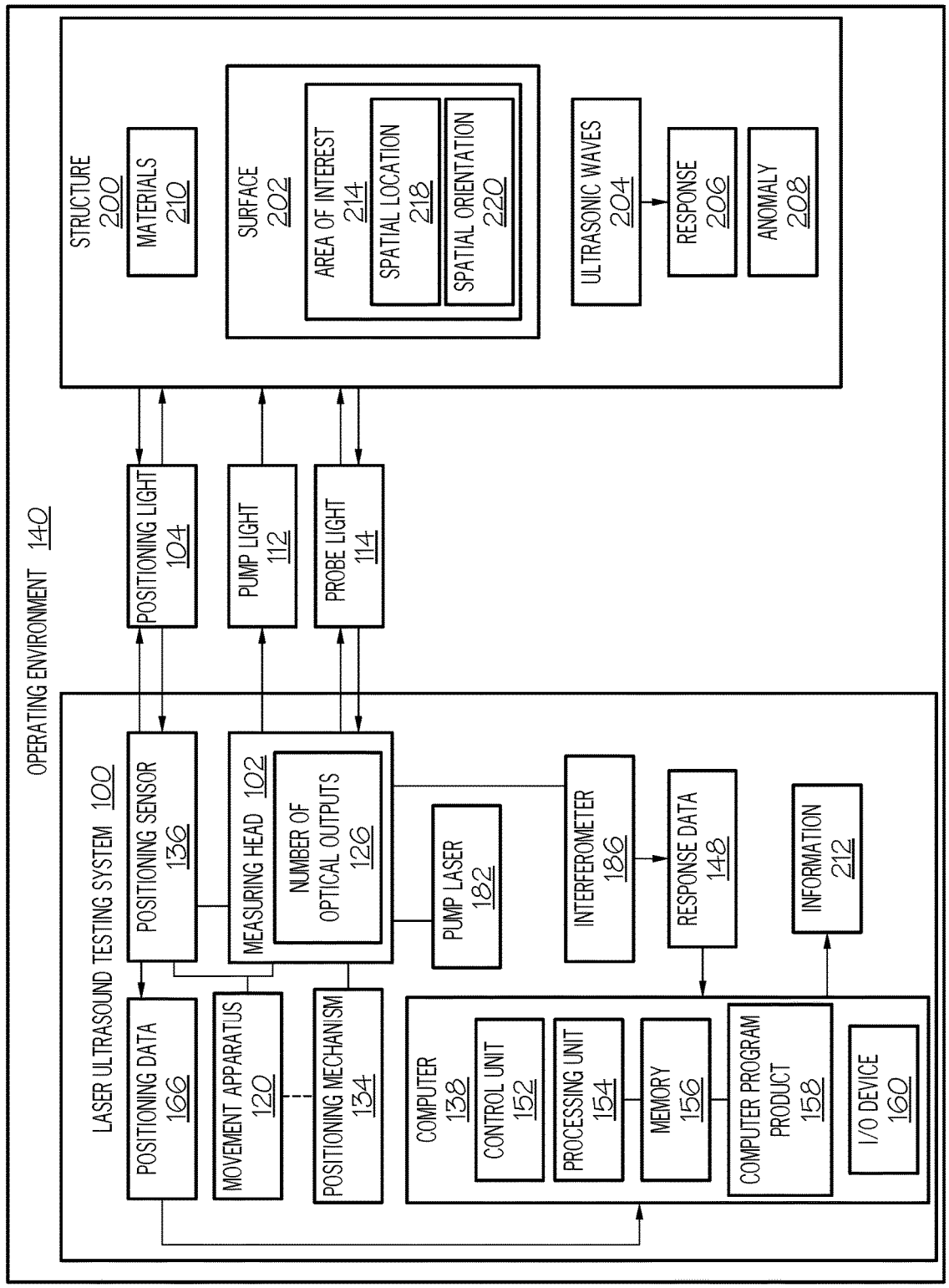
FIG. 1 is a schematic block diagram of an example of an operating environment for a laser ultrasound testing system.

The following detailed description refers to the accompanying drawings, which illustrate specific examples described by the disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic and/or operational step described in connection with the example is included in at least one embodiment and/or implementation of the subject matter according to the present disclosure. Thus, the phrases "an example," "some examples," and similar language throughout the present disclosure may, but do not necessarily, refer to the same example. Further, the subject matter characterizing any one example may, but does not necessarily, include the subject matter characterizing any other example.

The present disclosure provides examples of laser ultrasound testing systems and methods for testing a structure using laser ultrasound. Laser ultrasound testing is a form of nondestructive testing used to evaluate properties, parameters, and/or characteristics of a test object, such as detection of anomalies present within the test object. Generally, the present disclosure provides examples of systems and methods for selectively controlling alignment and standoff of light projected onto a surface of the structure during a laser ultrasound testing operation, for example, by selecting and consistently maintaining the projection angle of the light and/or the focal depth of light, by selectively adjusting the spatial location and/or spatial orientation of the optical output of the light, or a combination thereof. Selective control of the projection angle of the light and/or selective orientation of the optical output enables the light to be selectively angularly oriented relative to the surface of the structure. Selective control of the focal depth of the light and/or selective location of the optical output enables a focal point of the light to be selectively located relative to the surface of the structure. Examples of the systems and methods disclosed herein may be used for nondestructive testing of a variety of structures. Examples of the disclosed methods may also be used with a variety of other types of optical systems, where an angle of incidence of light relative to a surface of a structure and a location of a focal point of light relative to the structure are principle factors for proper operation.

Figure 2:
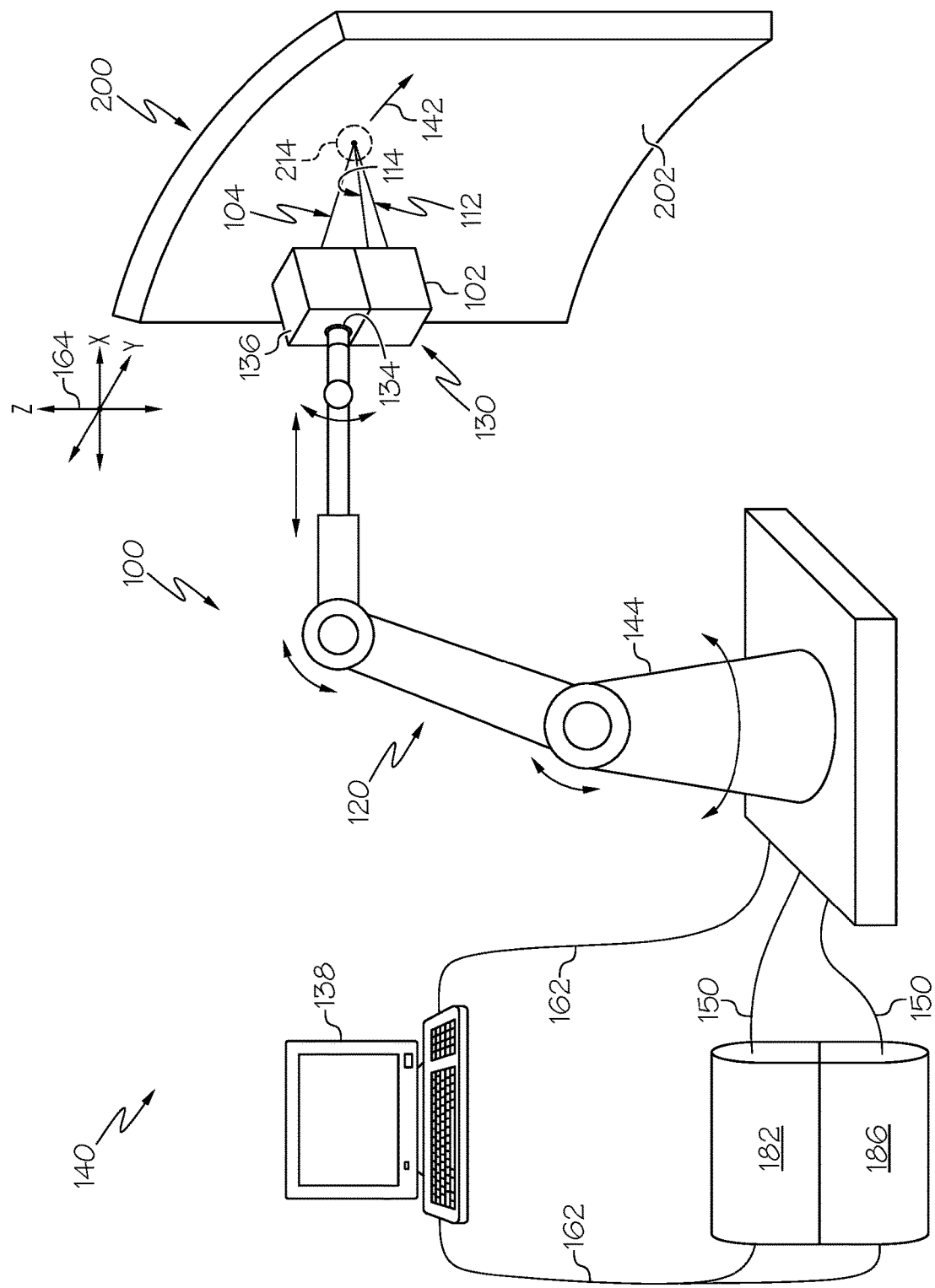
FIG. 2 is a schematic illustration of an example of the laser ultrasound testing system.

FIGS. 1 and 2 illustrate examples of an operating environment 140. In some examples, the operating environment 140 is an example of a testing environment in which a structure 200 is tested, for example, using a laser ultrasound testing system, referred to generally herein as system 100. In some examples, the operating environment 140 is an example of a manufacturing environment in which the structure 200 is manufactured, constructed, or otherwise fabricated using any one or more known manufacturing apparatuses and techniques and is tested using the system 100.

For the purpose of this disclosure, the terms "test," "testing," and similar terms, such as in reference to testing the structure 200, refer to nondestructive testing (NDT), nondestructive examination (NDE), nondestructive inspection (NDI), nondestructive evaluation (NDE), and other inspection techniques used to analyze and/or evaluate properties, parameters, and/or characteristics of a structure, material, or component without permanently altering or causing damage to the article being tested.

Generally, for the purpose of this disclosure, the structure 200 includes any object that is to be tested using laser ultrasound, such as by the system 100. In some examples, the structure 200 is a manufactured article or assembly. In some examples, the structure 200 is a manufactured component, such as a constituent part or element, of an article or assembly. In an example, the structure 200 is a vehicle, such as an aircraft. In an example, the structure 200 is a structural assembly of a vehicle, such as a fuselage or wing of an aircraft. In an example, the structure 200 is a component of a vehicle, such as a skin panel, a frame member, or a stiffening member of an aircraft.

The structure 200 includes, or is formed from, a number of materials 210. For the purpose of this disclosure, the term "number of," means one or more items. In this manner, the number of materials 210 includes one or more materials. In some examples, the number of materials 210 includes composite materials, metallic materials, plastic materials, or other suitable types of materials. In some examples, the structure 200 is a laminate structure. The laminate structure includes, or is formed from, a plurality of material layers. In an example, one or more of the material layers includes, or is formed from, composite materials.

In some examples, the structure 200 is a composite structure formed by combining two or more functional composite materials. In some examples, the number of materials 210 (e.g., the composite materials) includes a matrix material and a reinforcement material. The matrix material may take the form of a thermoset resin (e.g., epoxy), a thermoplastic polymer (polyester, vinyl ester, nylon, etc.), or other types of matrix material. The reinforcement material may take the form of fibers (e.g., glass fibers, carbon fibers, aramid fibers, etc.) or other types of reinforcement materials. The fibers may be unidirectional or may take the form of a woven or nonwoven cloth, fabric, or tape.

Certain composite structures, such as fiber-reinforced polymer composites, are tough and lightweight, which may be beneficial for certain structures, such as those used in the aerospace industry. Accordingly, the present disclosure recognizes that the use of composite structures may be advantageous in the manufacture of aircraft to decrease the weight of the aircraft, which improves performance features, such as payload capacity and fuel efficiency. Composite structures may also provide longer service life for various components of the aircraft.

In manufacturing composite structures, layers of composite material are typically laid up on a tool. The layers may include fibers in the form of sheets. The sheets may take the form of fabrics, tape, tows, or other suitable forms. In some cases, resin may be infused or preimpregnated into the sheets. These types of sheets are commonly referred to as prepreg. The different layers of prepreg may be laid up in different orientations and different numbers of layers may be used depending on the performance requirements of the composite structure being manufactured.

In some examples, the structure 200 is a homogeneous or isotropic structure formed of a single material, such as metal or thermoplastic, that is manufactured by any of various techniques, such as stamping, casting, molding, and the like.

The present disclosure recognizes that following manufacture of the structure 200, evaluation of various properties, parameters, and/or characteristics of the structure 200, without damaging the structure 200, is beneficial. The present disclosure also recognizes that anomalies 208 (FIG. 1) may be introduced to the structure 200 during manufacturing or during use of the structure 200. Detection of such anomalies 208 is advantageous, but can be difficult. For example, due to the spacing of the layers that make up a composite structure, inspection of the composite structure may be more difficult than desired for some locations or some types of anomalies. Additionally, some anomalies may not be detectable using certain types of nondestructive inspecting techniques.

For the purpose of this disclosure, the term "anomaly," "anomalies," and similar terms, such as in reference to an anomaly 208, refers to any parameter, property, and/or characteristic of a structure, such as the structure 200 being tested using laser ultrasound, that is abnormal, inconsistent, irregular, or otherwise undesirable. Examples of the anomaly 208 include, but are not limited to, nonconforming porosity (e.g., an undesirably low or high level of porosity), an irregular lamination (e.g., a delamination), and other internal defects or flaws of the structure being testing using laser ultrasound.

The present disclosure recognizes that testing certain structures, such as those having a non-planar surface or a non-constant geometry, may be more difficult than desired using certain types of nondestructive inspecting techniques. Accordingly, laser ultrasound testing is advantageous by enabling testing to be performed without requiring physical contact with the surface of the structure or use of an ultrasound-coupling medium.

Throughout the present disclosure, movement of light across a surface of a structure, for example, following along a predefined scan path or movement path, may be referred to as a laser scanning process or, simply, laser scanning.

Figure 4:
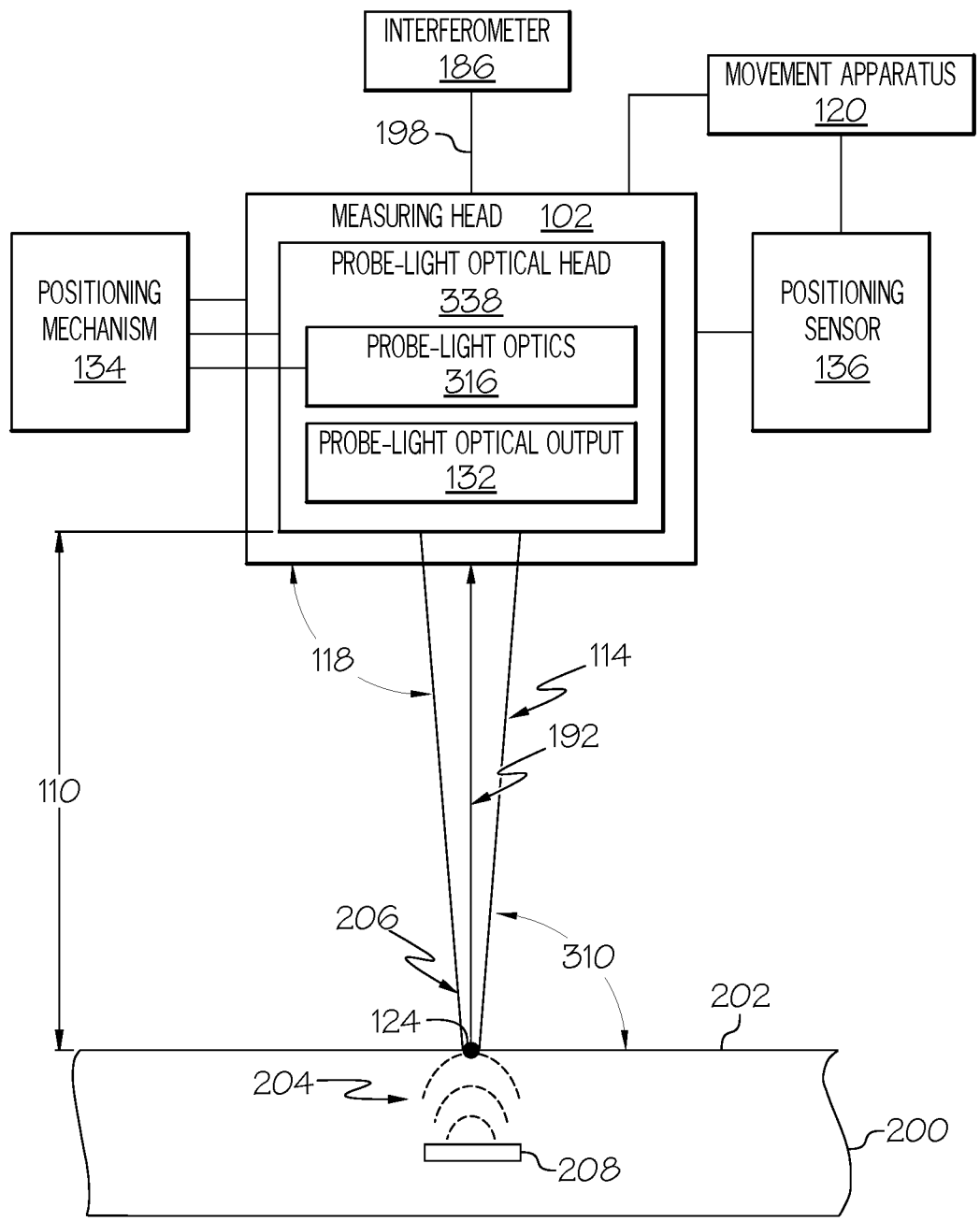
FIG. 4 is a schematic illustration of an example of a portion of the laser ultrasound testing system depicting probe light being transmitted onto the surface of the structure.

Referring to FIGS. 1 and 2, in an example, the system 100 includes a measuring head 102. The measuring head 102 is configured to transmit, direct, or otherwise project pump light 112, for example, from a number of optical outputs 126 (FIG. 1) of the measuring head 102, on, or onto, on a surface 202 of the structure 200. For the purpose of the present disclosure, the phrase "a number of" items means one or more of the items. The measuring head 102 is also configured to transmit, direct, or otherwise project probe light 114, for example, from the number of optical outputs 126, on, or onto, the surface 202 of the structure 200. The measuring head 102 is also configured to receive a portion of the probe light 114 reflected back from the surface 202, also referred to herein as reflected-probe light 192 (FIG. 4).

During the laser ultrasound testing operation, the measuring head 102 is spatially positioned so that the pump light 112 is directed onto the surface 202, such as an area of interest 214 (FIG. 1) of the surface 202, to generate ultrasonic waves 204 (FIGS. 1, 3, and 4) in the structure 200. The measuring head 102 is also spatially positioned so that the probe light 114 is directed onto the surface 202, such as the area of interest 214, and so that a portion of the probe light 114 reflected back from the surface 202, such as the area of interest 214, is received by the measuring head 102.

As used herein, the pump light 112 may also be commonly referred to, or known as, transmit light, excitation light, or pump laser light. As used herein, the probe light 114 may also be commonly referred to, or known as, receive light, detection light, or probe laser light. As used herein, the reflected portion of the probe light 114 may be commonly referred to, or known, as response light.

For the purpose of the present disclosure, the term "surface," such as in reference to the surface 202 of the structure 200, has its ordinary meaning as known to those skilled in the art and refers to any portion of an outer face of the structure 200 onto which light is transmitted during a laser ultrasound testing operation. For the purpose of the present disclosure, the term "area of interest," such as in reference to the area of interest 214, refers to a portion of the surface 202 or a predetermined surface area of the surface 202 that is intended to be illuminated by light during the laser ultrasound testing operation at any given position along a scan path of the light.

Figure 3:
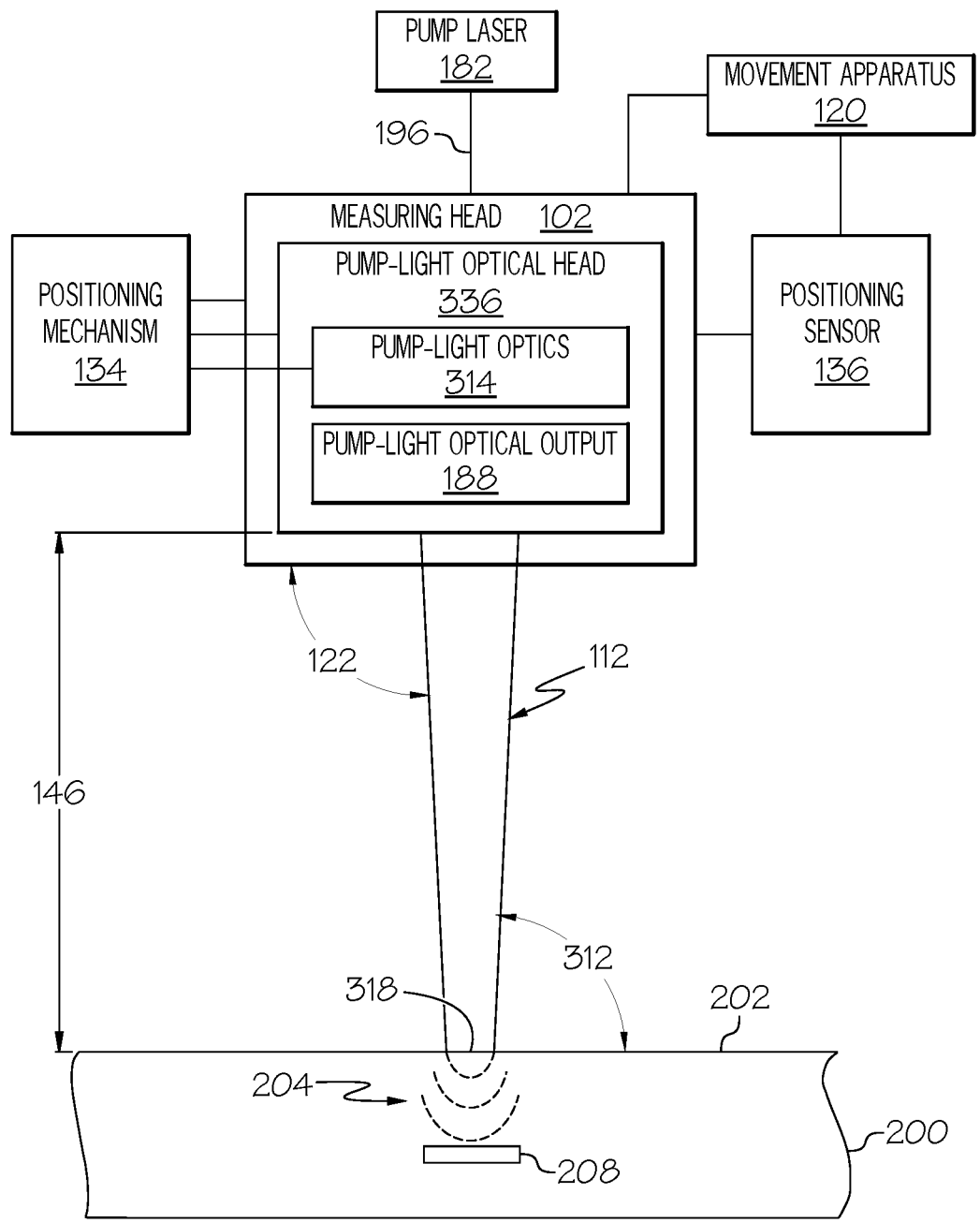
FIG. 3 is a schematic illustration of an example of a portion of the laser ultrasound testing system depicting pump light being transmitted on a surface of structure.

Referring generally to FIG. 1 and particularly to FIGS. 3 and 4, the system 100 generates ultrasonic waves 204 (FIGS. 3 and 4) using the pump light 112 and detects a response 206 (FIG. 4) to the ultrasonic waves 204 using the probe light 114. For the purpose of the present disclosure, the term "ultrasonic waves," such as in reference to the ultrasonic waves 204, has its ordinary meaning as known to those skilled in the art and refers to acoustic waves, or sound waves, formed in and/or transmitted through the structure 200, due to interaction between the pump light 112 and the surface 202. For the purpose of the present disclosure, the term "response," such as in reference to the response 206 to the ultrasonic waves 204, refers to a detectable reaction or feedback from interaction between the pump light 112 and the surface 202, for example, in the form of vibration speed on the surface, ultrasound pressure, and/or displacement of the surface 202. Analysis of the response 206 is used to identify parameters, properties, and/or characteristics of an interior of the structure 200, such as an indication of the presence of the anomaly 208 within the structure 200.

Referring generally to FIG. 1 and particularly to FIGS. 3 and 4, the pump light 112 (FIG. 3) strikes, or encounters, the surface 202 of the structure 200 and generates the ultrasonic waves 204 (FIGS. 3 and 4) within the structure 200. Energy in the pump light 112 generates the ultrasonic waves 204 through thermoelastic expansion or by ablation. The ultrasonic waves 204 interrogate an interior of the structure 200 and/or the surface 202 of the structure 200. For example, the ultrasonic waves 204 travel through the thickness of the structure 200, are reflected back (e.g., back wall echo), and return through the thickness of the structure 200. The ultrasonic waves 204 propagate to a surface position, resulting in displacement of the surface 202 and/or mechanical vibrations on the surface 202. The response 206 to the ultrasonic waves 204 represents the surface displacement, which is detected by the probe light 114 (FIG. 4) and measured. The probe light 114 is deflected or otherwise altered by interaction with ultrasonic waves 204 at the surface 202. The surface displacement affects a portion of the probe light 114 reflected back from the surface 202 and received by the measuring head 102. The measured signal from the probe light 114 is processed to yield and display information 212 (FIG. 1) about the structure 200, such as to identify parameters, properties, and/or characteristics of the structure 200, such as to indicate the presence of the anomaly 208.

The ultrasonic waves 204 may have a frequency from approximately twenty (20) kilohertz to approximately one (1) gigahertz depending upon, for example, a particular implementation of the laser ultrasound testing operation, the material 210 (FIG. 1) used to form the structure 200, a pulse width of the laser excitation, and other factors.

The present disclosure recognizes that, in certain circumstances, results obtained using laser ultrasound testing systems may be sensitive to a location of a focal point of probe light relative to a surface and/or an incidence angle of probe light relative to the surface. Accordingly, one or more examples of the disclosed system 100 provide for selective control of a location of a probe-light focal point 124 (FIG. 4) of the probe light 114 relative to the surface 202 and/or a probe-light incidence angle 310 (FIG. 4) of the probe light 114 relative to the surface 202. Selective control of the probe-light focal point 124 and/or the probe-light incidence angle 310 may be particularly beneficial when using a low energy laser system for laser ultrasound testing.

Figure 5:
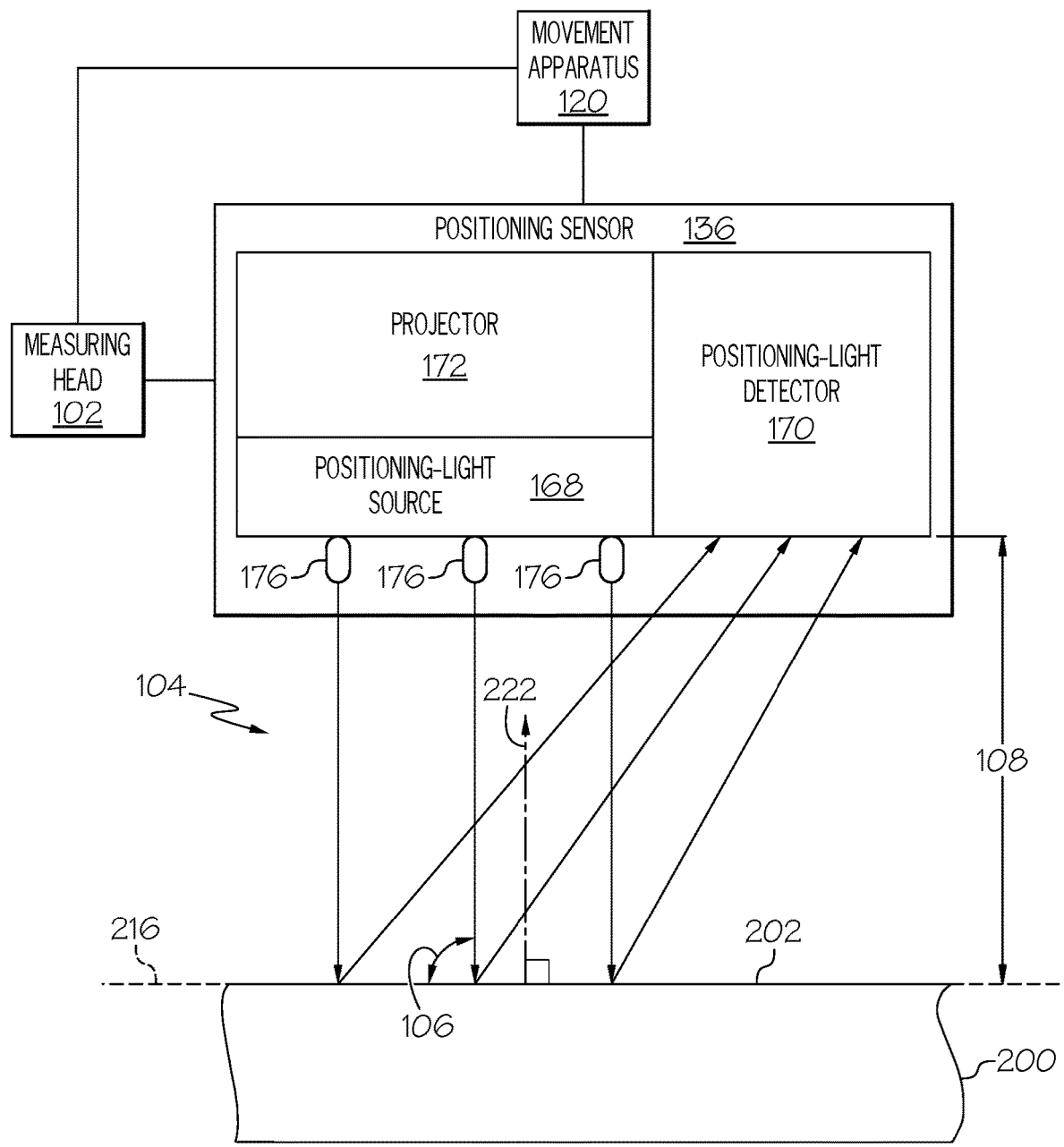
FIG. 5 is a schematic illustration of an example of a portion of the laser ultrasound testing system depicting positioning light being transmitted onto the surface of the structure.

Referring generally to FIGS. 1 and 2 and particularly to FIG. 5, in an example, the system 100 includes a positioning sensor 136. The positioning sensor 136 is configured to transmit, direct, or otherwise project positioning light 104 on, or onto, the surface 202 of the structure 200, such as the area of interest 214. The positioning sensor 136 is also configured to receive a portion of the positioning light 104 reflected back from the surface 202 (i.e., a reflected portion of the positioning light 104). A spatial location 218 and a spatial orientation 220 (FIG. 1) of the surface 202 is determined (e.g., estimated or measured), based on an evaluation of the portion of the positioning light 104 reflected back from the surface 202. In other words, the positioning sensor 136 is a transceiver system that is operable to transmit and receive the positioning light 104 during the laser ultrasound testing operation.

For the purpose of the present disclosure, the term "spatial location" of an item refers to a location of the item in three-dimensional space relative to a fixed reference frame and the term "spatial orientation" of an item refers to an angular orientation of the item in three-dimensional space relative to the fixed reference frame.

In an example, the positioning sensor 136 detects the reflected portion of the positioning light 104 reflected back from the surface 202 and generates position data 166 (FIG. 1). The position data 166 includes a plurality of data points that represent three-dimensional coordinates of a number of points on the surface 202, such as a number of points making up at least a portion of the area of interest 214. The position data 166, generated by the positioning sensor 136, is used to computationally determine the spatial location 218 and the spatial orientation 220 of a portion of the surface 202 illuminated by the positioning light 104, such as the area of interest 214.

The positioning sensor 136 may use any one of various 3D scanning techniques, such as time-of-flight or triangulation, to determine the spatial location of the number of points on the surface 202 of the structure 200, which are used to ascertain the spatial location 218 and the spatial orientation 220 of the area of interest 214. In an example, the positioning sensor 136 is, or includes, a three-dimensional (3D) scanner. In an example, the positioning sensor 136 is, or includes, a laser 3D scanner. In an example, the positioning sensor 136 is, or includes, a structured light 3D scanner.

In an example, the positioning sensor 136 is, or includes, a modulated light 3D scanner. In an example, the positioning sensor 136 is a light detecting and ranging (lidar) scanner.

Referring to FIG. 5, in an example, the positioning sensor 136 includes a positioning-light source 168, a projector 172, and a positioning-light detector 170. The positioning-light source 168 is configured to emit the positioning light 104. The projector 172 is optically coupled with the positioning-light source 168. The projector 172 is configured to transmit, direct, or otherwise project the positioning light 104 from an output of the projector 172 on, or onto, a portion of the surface 202 of the structure 200, such as the area of interest 214. The positioning-light detector 170 is configured to receive and detect a scattered portion of the positioning light 104 reflected back from the surface 202 of the structure 200 and to generate the position data 166 (FIG. 1).

In an example, projector 172 includes a number of optical elements configured to direct or modify the transmission of the positioning light 104 from the projector 172 onto the surface 202. Such optical elements may include, but are not limited to, at least one of a lens, a mirror, a diffractive optical element, a polarizer, a wave plate, a crystal, or other suitable optical elements.

In an example, the positioning-light detector 170 is, or includes, an image capturing device, such as a camera, a charge-coupled device (CCD) image sensor, a complementary metal-oxide-semiconductor (CMOS) image sensor, a photodiode array, and the like.

As illustrated in FIG. 5, in an example, the positioning-light source 168 includes a plurality of diodes 176 configured to emit the positioning light 104. In an example, the diodes 176 are laser diodes configured to emit positioning optical beams that are directed onto the surface 202, such as the area of interest 214. The positioning-light detector 170 is configured to detect scattered portions of the positioning light 104 reflected from the surface 202. In one or more example, the diodes 176 are laser diodes configured to emit infrared (IR) light (e.g., the positioning light 104 includes a plurality of beams of IR light) that are directed onto the surface 202 and the positioning-light detector 170 is configured to detect scattered portions of the IR light beams reflected from the surface 202.

In an example, positioning-light source 168 includes at least three diodes 176. At least three diodes 176 enable the positioning sensor 136 to ascertain both the spatial location 218 and the spatial orientation 220 of the portion of the surface 202 illuminated by the positioning light 104.

Referring generally to FIG. 1 and particularly to FIG. 4, in an example, the system 100 includes a positioning mechanism 134. The positioning mechanism 134 is configured to selectively locate (e.g., set and/or adjust) the probe-light focal point 124 (FIG. 4) of the probe light 114 on the surface 202, based on the spatial location 218 (FIG. 1) determined for the surface 202. The positioning mechanism 134 is further configured to selectively angularly orient (e.g., set and/or adjust) the probe light 114, the probe-light incidence angle 310 of the probe light 114, normal to the surface 202, such as the area of interest 214, based on the spatial orientation 220 (FIG. 1) determined for the surface 202. In such examples, the position data 166, generated by the positioning sensor 136, serves as positional feedback used to set and maintain the spatial location of the probe-light focal point 124 and the spatial orientation of the probe light 114 relative to the surface 202.

For the purpose of the present disclosure, the phrase "normal to the surface" includes a condition in which the item is exactly perpendicular to the surface and a condition in which the item is approximately perpendicular to the surface. Therefore, the probe light 114 being normal to the surface 202 includes a condition in which the probe-light incidence angle 310 of the probe light 114 is at a right angle relative to the surface 202 and a condition in which the probe-light incidence angle 310 of the probe light 114 is at an approximately right angle relative to the surface 202. For the purpose of the present disclosure, the term "approximately" refers to or represents a condition that is close to, but not exactly, the stated condition that still performs the desired function or achieves the desired result. For example, the term "approximately" may be interpreted to mean equal to or within a desired degree of accuracy, such as to a condition that is within 10% of the stated condition.

It should be appreciated that the degree of accuracy relative to normal of the probe light 114 may depend on various factors, including, but not limited to, the type and characteristics of the probe light 114 used during the laser ultrasound testing operation. For example, probe light 114 having a lower power or energy may require approximate normality or exact normality for proper detection of the response 206 to the ultrasonic waves 204.

Selective location of the probe-light focal point 124 and selective angular orientation of the probe light 114 may be achieved by any one of various techniques or combination of techniques.

As illustrated in FIG. 4, in an example, selective location of the probe-light focal point 124 and selective angular orientation of the probe light 114 is achieved by manipulation of the probe light 114. In an example, the positioning mechanism 134 is configured to selectively adjust the probe-light focal depth 110 of the probe light 114, which in turn selectively locates the probe-light focal point 124 of the probe light 114 on the surface 202. The positioning mechanism 134 is also configured to selectively adjust the probe-light projection angle 118 of the probe light 114, which in turn selectively angularly orients the probe light 114 normal to the surface 202.

For the purpose of the present disclosure, the projection angle of light, such as in reference to the probe-light projection angle 118 (FIG. 4) or a pump-light projection angle 122 (FIG. 3), has its ordinary meaning known to those skilled in the art and, for example, refers to a spatial angular orientation of light relative to a fixed reference frame. The projection angle of light corresponds to the incidence angle of the light with a surface. For the purpose of the present disclosure, the focal depth of light, such as in reference to the probe-light focal depth 110 (FIG. 4) or a pump-light focal depth 146 (FIG. 3), has its ordinary meaning known to those skilled in the art and, for example, refers to the distance travelled by light between a transmission output of light and a point of convergence of light. Generally, the focal depth of light corresponds to a location of the focal point of light.

Figure 6:
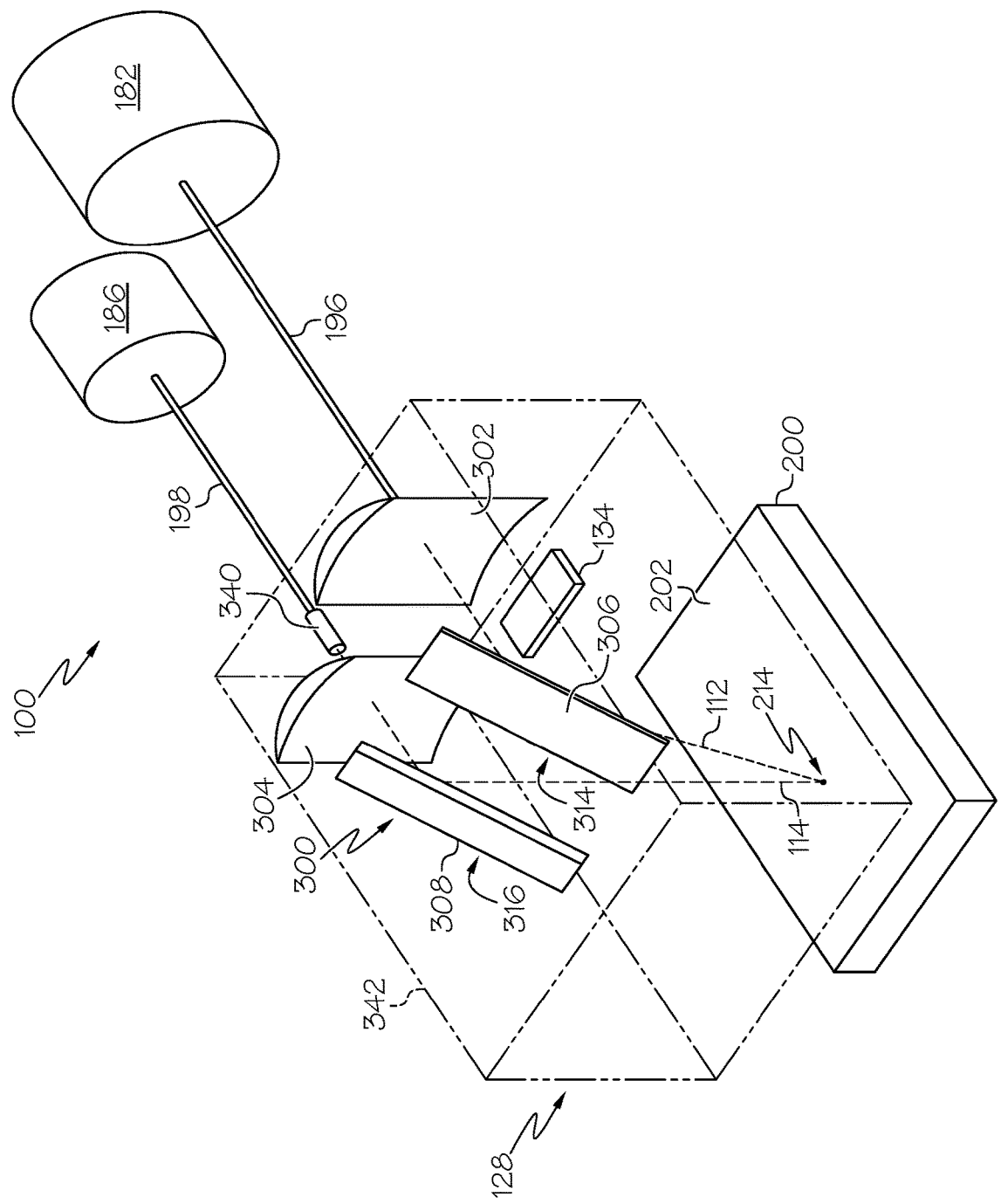
FIG. 6 is a schematic illustration of an example of a portion of the laser ultrasound testing system depicting pump light and probe light being transmitted onto the surface of the structure.

As illustrated in FIGS. 4 and 6, in an example, the measuring head 102 includes a number of probe-light optics 316 associated with the probe light 114. The positioning mechanism 134 manipulates (e.g., adjusts the spatial location of) one or more of the probe-light optics 316, which in turn selectively adjusts the probe-light focal depth 110 of the probe light 114 to selectively locate the probe-light focal point 124 of the probe light 114 on the surface 202. The positioning mechanism 134 manipulates (e.g., adjusts the spatial orientation of) one of more of the probe-light optics 316, which in turn selectively adjusts the probe-light projection angle 118 of the probe light 114 to selectively angularly orient the probe light 114 normal to the surface 202. In such examples, manipulation of one of more of the probe-light optics 316 is based on the positional feedback, or measurements, from the positioning sensor 136. In such examples, the positioning mechanism 134 is configured to selectively linearly move and/or selectively rotationally move one or more of the probe-light optics 316 independent of and relative to the probe-light optical head 338, the movement apparatus 120 (e.g., the robot 144), and the measuring head 102, which may increase the speed and the accuracy of laser scanning.

Selective adjustment of the probe-light focal depth 110 and selective adjustment of the probe-light projection angle 118 may be performed concurrently. Concurrent adjustment of the probe-light focal depth 110 and the probe-light projection angle 118 optimizes adjustment speed of the probe light 114 when the probe light 114 moves over the surface 202 during the laser ultrasound testing operation.

In another example, rather than manipulating of the probe light 114, selective location of the probe-light focal point 124 and/or selective angular orientation of the probe light 114 are achieved by selectively spatially locating and/or selectively spatially orienting a probe-light optical output 132 (FIG. 4), associated with the probe light 114, relative to the surface 202. As illustrated in FIG. 4, in an example, the positioning mechanism 134 is configured to selectively adjust a spatial location of the probe-light optical output 132 of the probe light 114 relative to the surface 202 to selectively locate the probe-light focal point 124 of the probe light 114 on the surface 202. The positioning mechanism 134 is configured to selectively adjust a spatial orientation of the probe-light optical output 132 of the probe light 114 relative to the surface 202 to selectively angularly orient the probe light 114 normal to the surface 202.

As illustrated in FIGS. 4 and 6, in an example, the measuring head 102 includes a probe-light optical head 338. The probe-light optical head 338 includes the probe-light optical output 132 (FIG. 4) of the probe light 114. The probe-light optical head 338 includes the number of probe-light optics 316. For example, the number of probe-light optics 316 is incorporated into, or is housed within, the probe-light optical head 338. The positioning mechanism 134 manipulates (e.g., adjusts the spatial location of) the probe-light optical head 338, which in turn selectively adjusts the spatial location of the probe-light optical output 132 relative to the surface 202 to locate the probe-light focal point 124 of the probe light 114 on the surface 202. The positioning mechanism 134 manipulates (e.g., adjusts the spatial orientation of) the probe-light optical head 338, which in turn selectively adjusts the spatial orientation of the probe-light optical output 132 relative to the surface 202 to angularly orient the probe light 114 normal to the surface 202. In such examples, spatial manipulation of the probe-light optical head 338 is based on the positional feedback from the positioning sensor 136. In such examples, the positioning mechanism 134 is configured to selectively linearly move and/or selectively rotationally move the probe-light optical head 338 independent of and relative to the pump-light optical head 336, the movement apparatus 120 (e.g., the robot 144), and the measuring head 102, which may increase the speed and the accuracy of laser scanning.

In an example, selective adjustment of the spatial location and selective adjustment of the spatial orientation of the probe-light optical head 338 relative to the surface 202 are performed concurrently. Concurrent adjustment of the spatial location and the spatial orientation of the probe-light optical head 338 optimizes adjustment speed of the probe light 114 when the probe light 114 moves over the surface 202 during the laser ultrasound testing operation.

The present disclosure also recognizes that, in certain circumstances, results obtained using laser ultrasound testing systems may be sensitive to a spot size of a spot formed on a surface by pump light and/or an angle of incidence of pump light relative to the surface. Accordingly, one or more examples of the disclosed system 100 provide for selective control of a pump-light spot size of a pump-light spot 318 (FIG. 3) formed on the surface 202 by the pump light 112 and/or a pump-light incidence angle 312 (FIG. 3) of the pump light 112 relative to the surface 202. Selective control of the pump-light spot size of pump-light spot 318 and/or the pump-light incidence angle 312 may be particularly beneficial when using a low energy laser system for laser ultrasound testing.

As illustrated in FIG. 3, in an example, the pump light 112 defines, or forms, the pump-light spot 318 on the surface 202. Pump light 112 is configured to define, or form, the pump-light spot 318 having a pump-light spot size within a desired, or predetermined, dimension, based on the spatial location 218 determined for the surface 202. In an example, the pump-light spot 318 has a pump-light spot size between approximately one (1) millimeter and approximately ten (10) millimeters. In another example, the pump-light spot 318 has a pump-light spot size of approximately one and a half (1.5) millimeters. The dimension of the pump-light spot 318 (i.e., the pump-light spot size) may refer to a diameter when the pump-light spot 318 is circular or a maximum dimension when the pump-light spot 318 is non-circular.

The pump-light spot size of the pump-light spot 318 (FIG. 4) may be defined by any one of various techniques. In an example, the pump-light spot size of the pump-light spot 318 is defined by selectively shaping the pump light 112, such as by selecting a diameter of an input of the pump light 112 or by adjusting the diameter of the pump light 112 with a collimator. In another example, the pump-light spot size of the pump-light spot 318 is defined by selectively adjusting the pump-light focal depth 146 (FIG. 3) of the pump light 112. In such an example, selective adjustment of the pump-light focal depth 146 may be performed in substantially the same manner as described above with regard to selective adjustment of the probe-light focal depth 110 (FIG. 4). In yet another example, the pump-light spot size of the pump-light spot 318 is defined by selectively adjusting a spatial location of a pump-light optical output 188 (FIG. 3) of the pump light 112 relative to the surface 202. In such an example, selective adjustment of the spatial location of the pump-light optical output 188 may be performed in substantially the same manner as described above with regard to selective adjustment of the probe-light optical output 132 (FIG. 4).

In an example, the positioning mechanism 134 is configured to selectively angularly orient the pump light 112 at a predetermined angular orientation relative to the surface 202, such as the area of interest 214 (FIG. 1), based on the spatial orientation 220 determined for the surface 202. In such examples, the position data 166, generated by the positioning sensor 136, serves as positional feedback used to set and maintain the spatial orientation of the pump light 112 relative to the surface 202.

In an example, the pump-light projection angle 122 of the pump light 112 is selectively angularly oriented so that the pump light 112 (e.g., pump-light incidence angle 312) is normal to the surface 202. In another example, the pump-light projection angle 122 of the pump light 112 is selectively angularly oriented so that the pump light 112 is non-normal to the surface 202.

It should be appreciated that whether or not the pump light 112 is angularly oriented normal to the surface 202 or non-normal to the surface 202 may depend on various factors, including, but not limited to, the type and characteristics of the pump light 112 used during the laser ultrasound testing operation. For example, pump light 112 having a higher power or energy may not require normality for proper generation of the ultrasonic waves 204 and pump light 112 having a lower power or energy may require approximate normality for proper generation of the ultrasonic waves 204.

Selective angular orientation of the pump light 112 may be achieved by any one of various techniques or combination of techniques. In an example, selective angular orientation of the pump light 112 is achieved by manipulation of the pump light 112. As illustrated in FIG. 3, in an example, the positioning mechanism 134 is configured to selectively adjust the pump-light projection angle 122 of the pump light 112 to selectively angularly orient the pump light 112 at the predetermined angular orientation relative to the surface 202.

As illustrated in FIGS. 3 and 6, in an example, the measuring head 102 includes a number of pump-light optics 314 associated with the pump light 112. The positioning mechanism 134 manipulates (e.g., adjusts the spatial orientation of) one of more of the pump-light optics 314, which in turn selectively adjusts the pump-light projection angle 122 of the pump light 112 to angularly orient the pump light 112 at the predetermined, or desired, angular orientation relative to the surface 202. In such examples, manipulation of one of more of the pump-light optics 314 is based on the positional feedback from the positioning sensor 136. In such examples, the positioning mechanism 134 is configured to selectively linearly move and/or selectively rotationally move one or more of the pump-light optics 314 independent of and relative to the pump-light optical head 336, the movement apparatus 120 (e.g., the robot 144), and the measuring head 102.

In another example, rather than manipulating of the pump light 112, selective angular orientation of the pump light 112 is achieved by selectively spatially orienting a pump-light optical output 188 (FIG. 3), associated with the pump light 112, relative to the surface 202. As illustrated in FIG. 3, in an example, the positioning mechanism 134 is configured to selectively adjust a spatial orientation of the pump-light optical output 188 of the pump light 112 relative to the surface 202 to selectively angularly orient the pump light 112 relative to the surface 202.

As illustrated in FIGS. 4 and 6, in an example, the measuring head 102 includes a pump-light optical head 336. The pump-light optical head 336 includes the pump-light optical output 188 (FIG. 3) of the pump light 112. The pump-light optical head 336 includes the number of pump-light optics 314. For example, the number of pump-light optics 314 is incorporated into, or is housed within, the pump-light optical head 336. The positioning mechanism 134 manipulates (e.g., adjusts the spatial orientation of) the pump-light optical head 336, which in turn selectively adjusts the spatial orientation of the pump-light optical output 188 relative to the surface 202 to angularly orient the pump light 112 at the predetermined orientation relative to the surface 202. In such examples, spatial manipulation of the pump-light optical head 336 is based on the positional feedback from the positioning sensor 136. In such examples, the positioning mechanism 134 is configured to selectively linearly move and/or selectively rotationally move the pump-light optical head 336 independent of and relative to the probe-light optical head 338, the movement apparatus 120 (e.g., the robot 144), and the measuring head 102.

In an example, the pump-light optical output 188 (FIG. 3) and the probe-light optical output 132 (FIG. 4) are examples of the number of optical outputs 126 (FIG. 1) of the measuring head 102. As illustrated in FIGS. 3 and 4, in an example, the probe-light optical output 132, associated with the probe light 114, and the pump-light optical output 188, associated with the pump light 112, are different optical outputs 126 of the measuring head 102. In other words, the measuring head 102 includes two (2) optical outputs 126, in which one (1) of the optical outputs 126 is associated with the pump light 112 (i.e., the pump-light optical output 188) and one (1) of the optical outputs 126 is associated with the probe light 114 (i.e., the probe-light optical output 132). In such an example, the pump-light optical head 336 and the probe-light optical head 338 are discrete elements that are housed within the measuring head 102 and that are simultaneously moved relative to the surface 202 by movement of the measuring head 102.

As illustrated in FIG. 6, in another example, the probe-light optical output 132, associate with the probe light 114, and the pump-light optical output 188, associated with the pump light 112, are the same optical output 126 of the measuring head 102. In other words, the measuring head 102 includes one (1) optical output 126 that is associated with both the pump light 112 and the probe light 114. In such an example, the pump-light optics 314 and the probe-light optics 316 are incorporated into, or are housed within, a complex-optical head 342 (FIG. 6). The complex-optical head 342 is integrated into the measuring head 102 so that the pump light 112 and the probe light 114 simultaneously move relative to the surface 202 by movement of the measuring head 102. In examples where the pump light 112 and the probe light 114 share a single optical output 126 of the measuring head 102, the probe-light projection angle 118 of the probe light 114 and the pump-light projection angle 122 of the pump light 112 are the same.

As illustrated in FIG. 2, in another example, rather than manipulating the pump light 112 and/or the probe light 114, at least one of selective location of the probe-light focal point 124 (FIG. 4), selective angular orientation of the probe light 114, formation of the desired pump-light spot size of the pump-light spot 318 (FIG. 3), and/or selective angular orientation of the pump light 112 is achieved by selectively spatially locating and/or selectively spatially orienting the number of optical outputs 126 (FIG. 1) of the measuring head 102, associated with the pump light 112 and the probe light 114, relative to the surface 202. In an example, the positioning mechanism 134 is operatively coupled with the measuring head 102 to selectively linearly move and/or rotationally move the measurement head 102 relative to the surface 202, which in turn selectively controls the spatial location and/or spatial orientation of number of optical outputs 126 of the measuring head 102. In an example, the positioning mechanism 134 selectively adjusts a spatial location of the number of optical outputs 126 of the measuring head 102 relative to the surface 202, which in turn selectively locates the probe-light focal point 124 of the probe light 114 on the surface 202 and/or selectively defines the desired pump-light spot size of the pump-light spot 318. The positioning mechanism 134 selectively adjusts a spatial orientation of the number of optical outputs 126 of the measuring head 102 relative to the surface 202, which in turn selectively angularly orients the probe light 114 normal to the surface 202 and/or selectively angularly orients the pump light 112 at the predetermined orientation relative to the surface 202. In such an example, the positioning mechanism 134 is configured to selectively linearly move and/or rotationally move the measuring head 102 independent of and relative to the movement apparatus 120 (e.g., the robot 144).

The positioning mechanism 134 may include one or more of motors (e.g., electric motors, pneumatic motors, and/or hydraulic motors), actuators (e.g., electric, pneumatic, and/or hydraulic linear actuators and/or rotary actuators), power-transmission components, gyroscopes, and the like.

Referring to FIGS. 1-3 and 6, in an example, the system 100 includes a pump laser 182. The pump laser 182 generates the pump light 112. The pump laser 182 is optically coupled with and transmits the pump light 112 to the measuring head 102, such as the pump-light optical head 336 (FIG. 3) and/or the pump-light optics 314 (FIGS. 3 and 6). The pump laser 182 is configured to generate the pump light 112 having a predetermined duration and energy sufficient to generate the ultrasonic waves 204 (FIG. 3) in the structure 200. In an example, the pump light 112 is a pulsed beam of light (e.g., a pulsed laser beam).

The pump laser 182 may be a pulsed laser generator, an array of laser diodes, or other optical source of pulsed light. In an example, the pump laser 182 is a low power, or low energy, fiber-based laser. In another example the pump laser 182 is a gas laser. In an example, the pump laser 182 is a neodymium-doped yttrium lithium fluoride (Nd:YLF) laser.

Referring to FIGS. 1, 2, 4, and 6, in an example, the system 100 includes an interferometer 186. The interferometer 186 generates the probe light 114 and detects the reflected portion of the probe light 114 reflected back from the surface 202. The interferometer 186 is optically coupled with, transmits the probe light 114 to, and receives the reflected portion of the probe light 114 from the measuring head 102, such as the probe-light optical head 338 (FIG. 4) and/or the probe-light optics 316 (FIGS. 4 and 6). The interferometer 186 is configured to generate the probe light 114 having a predetermined duration and energy sufficient to detect the ultrasonic waves 204 (FIG. 3). In an example, the probe light 114 is continuous wave light.

The interferometer 186 may include a number of probe-light detectors, such as a number of photodetectors. In an example, the interferometer 186 is a Sagnac interferometer that includes a number of superluminescent diodes (SLD). The number of superluminescent diodes emit the probe light 114. SLD light (i.e., the probe light 114) is low coherent light. In an example, the probe light 114 transmitted by the SLD is continuous.

In an example, the interferometer 186 generates response data 148 (FIG. 1). The response data 148 is used to identify the information 212 (FIG. 1) about the structure 200. Such information 212 includes, but is not limited to, a thickness of the structure 200, a material composition of the structure 200, an indication of whether any anomalies 208 are present on and/or in the structure 200, and/or other parameters, properties, and/or characteristics of the structure 200, such as porosity.

The response data 148 includes a plurality of data points. Generally, increasing the number of data points included in the response data 148 enables a higher signal-to-noise ratio to be achieved using currently available signal processing techniques. The number of data points in the response data 148 may be increased by increasing the rate at which the probe light 114 scans the structure 200, by scanning the same area of the surface 202 multiple times, by arranging the probe light 114 into a pattern or arranging the probe light 114 as an array on the surface 202, or a combination thereof.

Referring to FIGS. 1-4, the system 100 may have any one of various configurations of the pump laser 182 and the interferometer 186. In an example, the pump laser 182 and the interferometer 186 are separate components of the system 100. In another example, the pump laser 182 and the interferometer 186 are combined into a single component of the system 100. In another example, one or both of the pump laser 182 and/or the interferometer 186 forms a portion of, are co-located with, or are incorporated into the measuring head 102. In yet another example, one or both of the pump laser 182 and/or the interferometer 186 are independent of, separate from, or remotely located from the measuring head 102.

As illustrated in FIG. 2, in an example, one or both of the pump laser 182 and/or the interferometer 186 are optically coupled with the measuring head 102 over an optical communications link 150. In an example, the optical communications link 150 includes, or takes the form of, a number of optical fibers.

Generally, the pump laser 182 is configured to generate the pump light 112 having a number of pump-light properties. Each one of the properties of the pump light 112 has a value within a selected range. The range for each one of the properties is selected so that the pump light 112 is generated in a manner that causes the ultrasonic waves 204 to be formed in the structure 200 when the pump light 112 encounters the surface 202 of the structure 200 without causing any undesired anomalies in the structure 200 outside of selected tolerances. The properties of the pump light 112 may include, but are not limited to, wavelength, pulse repetition rate, spot size at the sample surface, pulse duration, power, energy per pulse, intensity, and other properties.

Similarly, the interferometer 186 is configured to generate the probe light 114 having a number of probe-light properties. Each one of the properties of the probe light 114 has a value within a selected range. The range for each one of the properties is selected so that the probe light 114 is generated in a manner that does not cause ultrasonic waves 204 to be formed in the structure 200 when the probe light 114 encounters the structure 200. The properties of the probe light 114 may include, but are not limited to, wavelength, pulse repetition rate, spot size at the sample surface, duration, power, energy, intensity, and other properties.

In an example, at least some of the properties of pump light 112 and at least some of the properties of the probe light 114 are different.

Referring to FIGS. 3 and 4, in an example, the pump-light focal depth 146 (FIG. 3) of the pump light 112 and the probe-light focal depth 110 (FIG. 4) the probe light 114 are different. In another example, the pump-light focal depth 146 of pump light 112 and the probe-light focal depth 110 the probe light 114 are the same.

In an example, the pump light 112 and the probe light 114 are aligned with each other, such as when the pump light 112 and the probe light 114 are directed from the same optical output 126 (FIG. 1), and, thus, the pump-light projection angle 122 (FIG. 3) of the pump light 112 and the probe-light projection angle 118 (FIG. 4) of the probe light 114 are the same projection angle. In another example, the pump light 112 and the probe light 114 are non-aligned with each other, such as when the pump light 112 and the probe light 114 are directed from the different optical outputs 126 (FIG. 1), and, thus, the pump-light projection angle 122 of the pump light 112 and the probe-light projection angle 118 of the probe light 114 are different.

In an example, the pump light 112 and the probe light 114 are transmitted simultaneously. In such examples, the pump light 112 and the probe light 114 may have different or independent modes of operation. In an example, the pump light 112 and the probe light 114 are separated using optical methods, based on different wavelengths for the two different types or modes of the pump light 112 and the probe light 114.

Referring to FIGS. 1 and 2, in an example, the positioning sensor 136 is coupled to the measuring head 102. In another example, the positioning sensor 136 forms a portion of, is co-located with, or is incorporated into the measuring head 102. In such examples, movement of the measuring head 102 and the positioning sensor 136 is performed simultaneously. In other words, during the laser ultrasound testing operation movement or positioning of the measuring head 102 relative to the surface 202 simultaneously moves or co-positions the positioning sensor 136 relative to the surface 202. In yet another example, the positioning sensor 136 is independent of, separate from, or remotely located from the measuring head 102. In such an example, movement of the measuring head 102 and the positioning sensor 136 is performed sequentially or is otherwise temporally separated, during the laser ultrasound testing operation Referring to FIGS. 1 and 2, in an example, the system 100 includes a movement apparatus 120. The movement apparatus 120 is coupled to the measuring head 102 and the positioning sensor 136. The movement apparatus 120 is configured to selectively move or otherwise spatially manipulate the measuring head 102 and the positioning sensor 136 relative to the structure 200.

During the laser ultrasound testing operation, the movement apparatus 120 approximately spatially positions (e.g., globally positions) the positioning light 104, the pump light 112, and the probe light 114 relative to the surface 202. During laser scanning of the surface 202 using the pump light 112 and the probe light 114, the movement apparatus 120 moves (e.g., globally moves) the positioning light 104, the pump light 112, and the probe light 114 over to the surface 202, such as along a scan path 142 (FIG. 2). Movement of the positioning sensor 136 moves the positioning light 104 over the surface 202 to direct the positioning light 104 onto the surface 202 and to receive the reflected portion of the positioning light 104 back from the surface 202. Movement of the measuring head 102 moves the pump light 112 and the probe light 114 over the surface 202 to direct the pump light 112 and the probe light 114 onto the surface 202 and to receive the reflected portion of the probe light 114 back from the surface 202. Once the pump light 112 and the probe light 114 are globally positioned relative to the area of interest 214 on the surface 202, the positioning mechanism 134 locally positions the probe light 114 so that the probe-light focal point 124 is located on the surface 202 and the probe light 114 is oriented normal to the surface 202 and locally positions the pump light 112, based on the spatial location 218 (FIG. 1) and the spatial orientation 220 (FIG. 1) determined for the area of interest 214, without further global movement of the measuring head 102.

In an example, the movement apparatus 120 globally moves the pump light 112, the probe light 114, and the positioning light 104 over the surface 202 along the scan path 142 that is predetermined or pre-programmed. In an example, the scan path 142 is a raster scan path.

When the measuring head 102 is moved relative to the structure 200 to move the probe light 114 over the surface 202, the positioning mechanism 134 is configured to consistently maintain the probe-light focal point 124 of the probe light 114 to be located on the surface 202, in response to a change in the spatial location 218 determined for the surface 202 and consistently maintain the probe light 114 to be angularly oriented normal to the surface 202, in response to a change in the spatial orientation 220 determined for the surface 202. As described herein, consistently maintaining the probe-light focal point 124 of the probe light 114 to be located on the surface 202 may be achieved by regularly adjusting the probe-light focal depth 110 (FIG. 4) and/or the spatial location of the probe-light optical output 132 (FIG. 4) relative to the surface 202 using the positioning mechanism 134. Similarly, consistently maintaining the probe light 114 to be angularly oriented normal to the surface 202 may be achieved by regularly adjusting the probe-light projection angle 118 (FIG. 4) and/or the spatial orientation of the probe-light optical output 132 (FIG. 4) relative to the surface 202 using the positioning mechanism 134.

Optionally, when the measuring head 102 is moved relative to the structure 200 to move the pump light 112 over the surface 202, the positioning mechanism 134 is configured to consistently maintain the desired pump-light spot size of the pump-light spot 316 (FIG. 3), in response to a change in the spatial location 218 determined for the surface 202 and consistently maintain the pump light 112 to be angularly oriented at the predetermined angular orientation relative to the surface 202, in response to a change in the spatial orientation 220 determined for the surface 202. As described herein, consistently maintaining the desired pump-light spot size of the pump-light spot 316 may be achieved by regularly adjusting the pump-light focal depth 146 (FIG. 3) and/or the spatial location of the pump-light optical output 188 (FIG. 3) relative to the surface 202 using the positioning mechanism 134. Similarly, consistently maintain the pump light 112 to be angularly oriented at the predetermined angular orientation relative to the surface 202 may be achieved by regularly adjusting the pump-light projection angle 122 (FIG. 3) and/or the spatial orientation of the pump-light optical output 188 (FIG. 3) relative to the surface 202 using the positioning mechanism 134.

For the purpose of the present disclosure, the terms "consistent," "consistently," and similar terms such as in reference to a condition being consistent or consistently maintaining a condition, refers to a condition of an activity, action, or operation that is unchanging in nature, character, or effect over time or an activity, action, or operation that is performed the same way or that has the same effect over time, for example, within an acceptable tolerance or accuracy. In an example, the terms "consistently," "consistent," and similar terms may refer to a condition that is subject to change, but that is selectively controlled to prevent or mitigate such a change. In an example, the terms "consistently," "consistent," and similar terms may refer to a condition that is continuous or constant.

The movement apparatus 120 may be implemented using a number of different types of automatically controlled or programmable systems. As illustrated in FIG. 2, in an example, the movement apparatus 120 includes, or takes the form of, a robot 144. The robot 144 may be, for example, a scanning robotic arm that is configured to move the transceiver assembly 128 and the positioning sensor 136 about a number of axes relative to the structure 200. In an example, the robot 144 includes a base, one or more arms, and one or more actuators (e.g., servomotors) that are operable to move the various arms. In other examples, the movement apparatus 120 includes a gantry robot or other suitable type of movement system.

As illustrated in FIG. 2, in an example, the measuring head 102 takes the form of, or is incorporated with, an end effector 130 of the robot 144. Similarly, in an example, the positioning sensor 136 takes the form of, or is incorporated with, the end effector 130 of the robot 144. The end effector 130 may be removably coupled to the robot 144 and the robot 144 is configured to selectively position and move the end effector 130 relative to the structure 200.

Referring to FIGS. 1 and 2, in an example, the system 100 includes a computer 138. The computer 138 is configured to control operation of the system 100. In an example, the computer 138 is configured to selectively control operation and function of the movement apparatus 120, the pump laser 182, the interferometer 186, the measuring head 102, the positioning sensor 136, the positioning mechanism 134, and other functional components of the system 100. In an example, the computer 138 includes, or takes the form of, a number of computers or a computer system. When more than one computer is present, the computers may be in communications with each other through a communications medium, such as a network.

As illustrated in FIG. 2, in an example, the computer 138 is communicatively coupled with one or more of the movement apparatus 120, the pump laser 182, the interferometer 186, the measuring head 102, the positioning sensor 136, and/or the positioning mechanism 134 over a data communications link 162. The data communications link 162 may include a number of wired connections, a number of wireless connections, or a combination thereof. The computer 138 provides operating instructions over the data communications link 162. The computer 138 receives the positioning data 166 (FIG. 1) from the positioning sensor 136 over the data communications link 162. The computer 138 receives the response data 148 (FIG. 1) from the interferometer 186 over the data communications link 162.

As illustrated in FIG. 1, in an example, the computer 138 includes, or implements operation of, a control unit 152. The control unit 152 is configured to selectively control operation of one or more of the movement apparatus 120, the pump laser 182, the interferometer 186, the measuring head 102, the positioning sensor 136, and/or the positioning mechanism 134 and other functional components of the system 100. The control unit 152 may include, or take the form of, a number of controllers. In an example, a corresponding controller operatively controls each one of the movement apparatus 120, the pump laser 182, the interferometer 186, the measuring head 102, the positioning sensor 136, and/or the positioning mechanism 134. In another example, a corresponding controller operatively controls more than one of the movement apparatus 120, the pump laser 182, the interferometer 186, the measuring head 102, the positioning sensor 136, and/or the positioning mechanism 134.

In an example, the computer 138 (e.g., via the control unit 152) selectively controls the spatial position of the measuring head 102 and the positioning sensor 136 relative to the structure 200, for example, via selective control of movement of the movement apparatus 120.

In an example, the computer 138 selectively controls various properties of the pump light 112 including, but not limited to, wavelength, illumination rate, illumination duration, energy, intensity, and other properties, for example, via selective control of the pump laser 182 and/or the measuring head 102.

In an example, the computer 138 (e.g., via the control unit 152) selectively controls various properties of the probe light 114 including, but not limited to, wavelength, illumination rate, illumination duration, energy, intensity, and other properties, for example, via selective control of the interferometer 186 and/or the measuring head 102.

In an example, the computer 138 (e.g., via the control unit 152) selectively controls various properties of the positioning light 104 including, but not limited to, wavelength, illumination rate, illumination duration, energy, intensity, and other properties, for example, via selective control of the positioning sensor 136.

In an example, the computer 138 (e.g., via the control unit 152) selectively controls the spatial location of the probe-light focal point 124 of the probe light 114 and the spatial orientation of the probe light 114 relative to the surface 202 for example, via selective control of positioning mechanism 134 (FIG. 4).

In an example, the computer 138 (e.g., via the control unit 152) selectively controls the spatial orientation of the pump light 112 relative to the surface 202 for example, via selective control of positioning mechanism 134 (FIG. 3).

Referring to FIG. 1, in an example, the computer 138 is operable to analyze or evaluate the position data 166 generated by the positioning sensor 136. Analysis or evaluation of the position data 166 is used to determine (e.g., estimate or measure) the spatial location 218 and the spatial orientation 220 of at least a portion of the surface 202 illuminated by the positioning light 104, such as the area of interest 214. In an example, the computer 138 computationally determines the spatial location 218 and the spatial orientation 220 of the area of interest 214, based on analysis of the position data 166. The spatial location 218 and the spatial orientation 220 of the surface 202 may form a portion of the information 212 generated by the computer 138.

Referring to FIGS. 1 and 2, in an example, the computer 138 is operable to ascertain the spatial location 218 and the spatial orientation 220 of a portion of the surface 202, such as the area of interest 214 of the surface 202, relative to a reference frame 164 (FIG. 2) of the operating environment 140. The reference frame 164 is a virtual, reference coordinate system that is defined with respect to and fixed relative to the operating environment 140. In an example, the reference frame 164 is a fixed three-dimensional Cartesian coordinate system that is defined by an X-axis, a Y-axis, and a Z-axis. In other examples, the reference frame 164 employs other reference systems, such as a polar coordinate system.

Throughout the present disclosure, the spatial location and the spatial orientation of an item may be referred to collectively as a spatial position of that item. Accordingly, the spatial position of a portion of the surface 202, such as the area of interest 214, is represented by five (5) coordinates (e.g., XYZ-coordinates and two angles). When determining the spatial position of the surface 202 from the position data 166 (FIG. 1), a portion of the surface 202 is represented by a number of points sampled by the positioning light 104. The XYZ-coordinate of each point is determined relative to the reference frame 164. Similarly, the spatial position of the measuring head 102 and/or the positioning sensor 136 is represented by five (5) coordinates (e.g., XYZ-coordinates and two angles) of a virtual reference frame fixed relative to and corresponding to the measuring head 102 and the positioning sensor 136 relative to the reference frame 164.

In an example, the computer 138 is operable to determine the probe-light focal depth 110 (FIG. 4) and/or the spatial location of the probe-light optical output 132 (FIG. 4) relative to the surface 202 that is appropriate or applicable to selectively spatially locate the probe-light focal point 124 of the probe light 114 on the surface 202, based on the spatial location 218 determined for the surface 202. The probe-light focal depth 110 and/or the spatial location of the probe-light optical output 132 are selectively controlled by the positioning mechanism 134 in response to instructions provided by the computer 138.

In an example, the computer 138 is operable to determine the probe-light projection angle 118 (FIG. 4) and/or the spatial orientation of the probe-light optical output 132 (FIG. 4) relative to the surface 202 that is appropriate or applicable to selectively spatially orient the probe light 114 normal to the surface 202, based on the spatial orientation 220 determined for the surface 202. The probe-light projection angle 118 and/or the spatial orientation of the probe-light optical output 132 are selectively controlled by the positioning mechanism 134 in response to instructions provided by the computer 138.

In an example, the computer 138 is operable to determine the pump-light focal depth 146 (FIG. 3) and/or the spatial location of the pump-light optical output 188 (FIG. 3) relative to the surface 202 that is appropriate or applicable to achieve the desired pump-light spot size of the pump-light spot 318 formed on the surface 202. The pump-light focal depth 146 and/or the spatial location of the pump-light optical output 188 are selectively controlled by the positioning mechanism 134 in response to instructions provided by the computer 138. Alternatively, the desired pump-light spot size of the pump-light spot 318 may be achieved by setting a diameter of the pump light 112, thus not requiring computer control of the pump-light focal depth 146 and/or the spatial location of the pump-light optical output 188.

In an example, the computer 138 is operable to determine the pump-light projection angle 122 (FIG. 3) and/or the spatial orientation of the pump-light optical output 188 (FIG. 3) relative to the surface 202 that is appropriate or applicable to selectively spatially orient the pump light 112 at the predetermined orientation relative to the surface 202, based on the spatial orientation 220 determined for the surface 202. The pump-light projection angle 122 and/or the spatial orientation of the pump-light optical output 188 are selectively controlled by the positioning mechanism 134 in response to instructions provided by the computer 138.

Referring to FIGS. 1 and 2, in an example, the computer 138 is operable to selectively control the movement apparatus 120, coupled to the measuring head 102 and the positioning sensor 136, so that the positioning light 104, the pump light 112, and the probe light 114 move over the surface 202, along the scan path 142 (FIG. 2). The computer 138 is operable to regularly evaluate, or re-evaluate, the position data 166 (FIG. 1), generated by the positioning sensor 136, to determine any change in the spatial location 218 (FIG. 1) and/or the spatial orientation 220 (FIG. 1) of the surface 202, such as of each one of additional areas of interest 214 disposed along the scan path 142, as the positioning light 104 moves over the surface 202 along the scan path 142. The spatial location 218 and the spatial orientation 220 of the surface 202, such as the area of interest 214, are determined, based on evaluation of the position data 166 before the pump light 112 and the probe light 114 are projected on the area of interest 214. In other words, the positioning light 104 precedes the pump light 112 and the probe light 114 along the scan path 142 such that a change in the spatial location 218 and/or the spatial orientation 220 of the surface 202 can be determined and then the pump light 112 and/or the probe light 114 can be correctly (e.g., regularly) adjusted as needed for testing at the next measurement position on the surface 202. The computer 138 is operable to regularly evaluate, or re-evaluate, the response data 148 (FIG. 1), generated by the interferometer 186, to evaluate the characteristics of the structure 200, such as at each one of additional areas of interest 214 disposed along the scan path 142, as the pump light 112 and the probe light 114 move over the surface 202 along the scan path 142.

For the purpose of the present disclosure, the term "regularly," such as in reference to regularly performing an action, activity, or operation, means that the action, activity, or operation is performed repeatedly at predefined times or at regular intervals, such as time intervals, spatial intervals, or activity intervals. In an example, the predefined intervals are temporally separated or interrupted by a predefined time period or action so to that the term "regularly" may refer to the action, activity, or operation being performed, ceased for a predefined interval, and performed again. In an example, the predefined intervals are in immediate connection or uninterrupted in time so that the term "regularly" may also refer to the action, activity, or operation being performed continuously or without cessation.

In an example, a pose of the movement apparatus 120 (e.g., the robot 144) corresponds to the spatial position (i.e., the spatial location and spatial orientation) of the measuring head 102 and the positioning sensor 136 (e.g., the end effector 130). The pose of the movement apparatus 120 and, thus, the spatial position of the measuring head 102 and the positioning sensor 136 may be known to the computer 138 or may be determined (e.g., computationally estimated or ascertained) by the computer 138.

In an example, the movement apparatus 120 includes one or more sensors (e.g., encoders, Reed switches, position sensors, contact switches, accelerometers, etc.) or other devices located and configured to sense, measure, or otherwise determine information indicative of a current location, speed, acceleration, and/or orientation of the measuring head 102 and/or positioning sensor 136 relative to the reference frame 164. The computer 138 receives information from the various sensors, devices, and/or from actuators indicating the pose of the movement apparatus 120 relative to the reference frame 164. The computer 138 then computationally determines (e.g., via inverse kinematics) the spatial position of the measuring head 102 and the positioning sensor 136 relative to the reference frame 164 and/or the surface 202 of the structure 200, based on the known (e.g., fixed) location and orientation of the measuring head 102 and the positioning sensor 136 relative to the movement apparatus 120.

During the laser ultrasound testing operation, the computer 138 is operable to analyze the response data 148 (FIG. 1) and generate the information 212 about the structure 200. This analysis includes an indication of various parameters, properties, and/or characteristics of the structure 200. This analysis may also include an indication of whether a number of anomalies 208 (FIG. 1) are present in the structure 200 and/or characteristics of the anomaly 208, such as size, outline shape, location, depth, and the like. In other words, the computer 138 is operable to determine whether the anomaly 208 is present in the structure 200 and identify various characteristics representing the anomaly 208. A determination of the existence, or presence, of the anomaly 208 and other characteristics of the anomaly 208 are based on an analysis of a plurality of data points collected over an illuminated area (e.g., the area of interest 214) representing the response 206 to the ultrasonic waves 204.

Referring to FIG. 1, in an example, the computer 138 is operable to generate a three-dimensional model, such as a polygon mesh or surface model, representing the portion of the surface illuminated by the positioning light 104 from the position data 166. In an example, the computer 138 generates a three-dimensional point cloud from the position data 166 representative of a plurality of points on a portion of the surface 202 illuminated by the positioning light 104, such as the area of interest 214. The computer 138 determines the spatial location 218 and the spatial orientation 220 of the surface 202, such as the area of interest 214, for example, relative to the reference frame 164 (FIG. 2), based on the three-dimensional point cloud. The computer 138 is operable, for example, by execution of instructions or implementation of a software tool (e.g., a computer program product 158) to extract the point cloud representative of the spatial location 218 and the spatial orientation 220 of the area of interest 214 directly from the position data 166.

As illustrated in FIG. 5, in an example implementation of a process used to determine the spatial location 218 (FIG. 1) and the spatial orientation 220 (FIG. 1) of the surface 202, the computer 138 may generate a reference plane 216 that represents a portion of the surface 202, such as the area of interest 214, based on the position data 166 generated by the positioning sensor 136. The reference plane 216 is defined by a plurality of points on the surface 202 that are illuminated by the positioning light 104, for example, located, inclusively, within the area of interest 214, and that share a common virtual plane. The reference plane 216 is defined by a plurality of points of the three-dimensional point cloud, representing the surface 202. The computer 138 determines the spatial location and the spatial orientation (i.e., the spatial position) of the reference plane 216 relative to the reference frame 164 (FIG. 2), based on a positioning-light incidence angle 106 and a standoff 108 relative to a corresponding point on the surface 202. The spatial location and the spatial orientation of the reference plane 216 represent the spatial location 218 and the spatial orientation 220 of the area of interest 214. The probe-light focal point 124 (FIG. 4) is spatially located relative to the reference plane 216. The computer 138 also generates a normal vector 222 that is located within the area illuminated by the positioning light 104, such as within the area of interest 214, and that is perpendicular to the reference plane 216. The probe light 114 (FIG. 4) and the pump light 112 (FIG. 3) are angularly oriented relative to the normal vector 222.

Referring to FIGS. 3, 4, and 6, generally, the measurement head 102 includes housing (depicted by broken lines in FIG. 6). The housing includes a frame or some other type of physical structure that encloses the pump-light optical head 336 and the probe-light optical head 338, as illustrated in FIGS. 3 and 4, or that defines the complex-optical head 342 that houses the pump-light optics 314 and the probe-light optics 316, as illustrated in FIG. 6.

As illustrated in FIGS. 3 and 6, in an example, the system 100 includes a number of pump-light optical fibers 196. The number of pump-light optical fibers 196 is an example of the optical communications link 150 illustrated in FIG. 2. In an example, the number of pump-light optical fibers 196 includes one (1) optical fiber. In another example, the number of pump-light optical fibers 196 includes a plurality of optical fibers, for example, arranged in a bundle or as an array. The pump-light optical fibers 196 may be implemented using any type of optical fiber that is configured to carry light within the optical fiber.

The pump-light optical fibers 196 optically couple the pump laser 182 and the pump-light optical head 336 (FIG. 3) or the pump-light optics 314 (FIGS. 4 and 6) together. The pump-light optical fibers 196 receive the pump light 112 from an output of the pump laser 182 and transmit the pump light 112 to pump-light optics 314, which are incorporated within the pump-light optical head 336 (FIG. 3) or are incorporated within the complex-optical head 342 (FIG. 6).

As illustrated in FIGS. 4 and 6, in an example, the system 100 includes a number of probe-light optical fibers 198. The number of probe-light optical fibers 198 is an example of the optical communications link 150 illustrated in FIG. 2. In an example, the number of probe-light optical fibers 198 includes one (1) optical fiber. In another example, the number of probe-light optical fibers 198 includes a plurality of optical fibers, for example, arranged in a bundle or as an array. The probe-light optical fibers 198 may be implemented using any type of optical fiber that is configured to carry light within the optical fiber.

The probe-light optical fibers 198 optically couple the interferometer 186 and the probe-light optical head 338 (FIG. 4) or the probe-light optics 316 (FIGS. 4 and 6) together. The probe-light optical fibers 198 receive the probe light 114 from an output of the interferometer 186 and transmit the probe light 114 to the probe-light optics 316, which are incorporated within the probe-light optical head 338 (FIG. 4) or are incorporated within the complex-optical head 342 (FIG. 6). The probe-light optical fibers 198 also receive the reflected portion of the probe light 114 back from the surface 202, representing the response 206 to the ultrasonic waves 204 (FIG. 4), and transmit the reflected portion of the probe light 114 back to the interferometer 186.

In an example, the pump light 112 and the probe light 114 are transmitted concurrently. As such, some temporal and spatial overlap may be present between the pump light 112 and the probe light 114 projected onto the surface 202, such as the area of interest 214. With this overlap, the probe-light optical fibers 198 are configured to receive the reflected portion of the probe light 114 at the same time as the pump-light optical fibers 196 transmit the pump light 112 and as the probe-light optical fibers 198 transmit the probe light 114.

In an example, the pump light 112 and the probe light 114 are transmitted using different phases, wavelengths, or both in order to reduce or eliminate cross-communication or interference of the pump light 112 and the probe light 114 between different ones of the pump-light optical fiber 196 and the probe-light optical fiber 198. In an example, mechanisms separate the light sources of the pump light 112 and the probe light 114. These mechanisms may reduce cross talk in the different ones of the pump-light optical fiber 196 and the probe-light optical fiber 198.

As illustrated in FIG. 6, in an example, the pump-light optics 314 and the probe-light optics 316 include a number of optical elements 300. FIG. 6 schematically illustrates example optical elements 300 forming the pump-light optics 314 and the probe-light optics 316, which are housed in the complex-optical head 342. While not explicitly illustrated in FIGS. 3 and 4, it should be noted that the pump-light optics 314, which are housed in the pump-light optical head 336 (FIG. 3), and the probe-light optics 316, which are housed in the probe-light optical head 338 (FIG. 4), also include the optical elements 300.

The optical elements 300 are configured to direct and/or modify the transmission of the pump light 112 and/or the probe light 114 from the measuring head 102 (e.g., the complex-optical head 342 or a corresponding one of the pump-light optical head 336 and the probe-light optical head 338) onto the surface 202, such as the area of interest 214. In various examples, the optical elements 300 enable the pump light 112 and the probe light 114 to have different wavelengths, enable the pump light 112 and the probe light 114 to have different and selectable focal depths, enable the pump light 112 and the probe light 114 to have different and selectable projection angles, and/or enable the pump light 112 and the probe light 114 to have different and selectable spot sizes. The optical elements 300 are also configured to direct the reflected portion of the probe light 114 for reception by the probe-light optical fibers 198 associated with the interferometer 186. The optical elements 300 may include, but are not limited to, at least one of a lens, a mirror, a diffractive optical element, a polarizer, a wave plate, a periodically-poled Lithium niobate crystal, or other suitable optical elements.

In an example, the positioning mechanism 134 (FIGS. 4 and 6) is operatively coupled with and manipulates one or more of the optical elements 300 of the probe-light optics 316 (FIGS. 4 and 6), which in turn selectively adjusts the probe-light focal depth 110 (FIG. 4) of the probe light 114 to selectively spatially locate the probe-light focal point 124 (FIG. 4) of the probe light 114 on, or at, the surface 202 of the structure 200. In an example, the positioning mechanism 134 is operatively coupled with and manipulates one or more of the optical elements 300 of the probe-light optics 316, which in turn selectively adjusts the probe-light projection angle 118 (FIG. 4) of the probe light 114 to spatially orient probe light 114 normal to the surface 202.

In an example, the positioning mechanism 134 (FIGS. 3 and 6) is operatively coupled with and manipulates one or more of the optical elements 300 of the pump-light optics 314 (FIGS. 3 and 6), which in turn selectively adjusts the pump-light focal depth 146 (FIG. 3) of the pump light 112 to selectively adjust the pump-light spot size of the pump-light spot 318 (FIG. 3) formed on the surface 202. In an example, the positioning mechanism 134 is operatively coupled with and manipulates one or more of the optical elements 300 of the pump-light optics 314, which in turn selectively adjusts the pump-light projection angle 122 (FIG. 3) of the pump light 112 to spatially orient pump light 112 relative to the surface 202.

In an example, one or more of the optical elements 300 of the pump-light optics 314 are configured to set the shape of the pump light 112 to define, or form, the pump-light spot 318 (FIG. 3) having the pump-light spot size of the desired dimensions (e.g., diameter) without control and/or adjustment via the positioning mechanism 134.

In an example, the optical elements 300 of the pump-light optics 314 are used to change the polarization or other parameters of the pump light 112. In an example, the optical elements 300 of the probe-light optics 316 are used to change the polarization or other parameters of the probe light 114.

As illustrated in FIG. 6, in an example, the optical elements 300 of the pump-light optics 314 include at least one pump-light lens 302. The pump-light lens 302 is configured to shape the pump light 112 and to cause the pump light 112 to be transmitted in the form of a beam that defines the pump-light spot 318 having the desired, predetermined, pump-light spot. In an example, the pump-light lens 302 is manipulated by the positioning mechanism 134 to adjust the pump-light focal depth 146 (FIG. 3) of the pump light 112.

As illustrated in FIG. 6, in an example, the optical elements 300 of the probe-light optics 316 include at least one probe-light lens 304. The probe-light lens 304 is configured to shape the probe light 114 and to cause the probe light 114 to be transmitted in the form of a beam having the probe-light focal point 124 located on the surface 202. In an example, the probe-light lens 304 is manipulated by the positioning mechanism 134 to adjust the probe-light focal depth 110 (FIG. 4). In an example, when the probe-light focal point 124 located on the surface 202, a probe-light spot size of a probe-light spot defined, or formed, on the surface 202 by the probe light 114, is between approximately one (1) micrometer and one hundred (100) micrometers, such as approximately thirty (30) micrometers.

As illustrated in FIG. 6, in an example, the optical elements 300 of the pump-light optics 314 include at least one pump-light mirror 306. The pump-light mirror 306 is configured to control the spatial orientation of the pump light 112 and, thus, the pump-light incidence angle 312 (FIG. 3) of the pump light 112 relative to the surface 202 of the structure 200 so that the pump light 112 is oriented at the predetermined orientation relative to the surface 202. In an example, the pump-light mirror 306 is manipulated by the positioning mechanism 134 to adjust the pump-light projection angle 122 (FIG. 3). In some examples, use and/or manipulation of the pump-light mirror 306 may not be necessary, such as in circumstances in which the movement and/or global positioning of the measuring head 102 is sufficient to spatially orient the pump light 112 at the predetermined angular orientation relative to the surface 202.

As illustrated in FIG. 6, in an example, the optical elements 300 of the probe-light optics 316 include at least one probe-light mirror 308. The probe-light mirror 308 is configured to control the spatial orientation of the probe light 114 and, thus, the probe-light incidence angle 310 (FIG. 4) of the probe light 114 relative to the surface 202 of the structure 200 so that the probe light 114 is oriented normal to the surface 202. In an example, the probe-light mirror 308 is manipulated by the positioning mechanism 134 to adjust the probe-light projection angle 118 (FIG. 4).

In an example, the pump light 112 and the probe light 114 are coincident or aligned with each other when transmitted from the measuring head 102, such as in examples where the measuring head 102 has one (1) optical output 126 (FIG. 1) and/or where the pump-light optics 314 and the probe-light optics 316 share certain ones of the optical elements 300, such as the complex-optical head 342 (FIG. 6).

In an example, the pump light 112 and the probe light 114 are not coincident or aligned with each other when transmitted from the measuring head 102, such as in examples where the measuring head 102 has two (2) optical outputs 126 and/or where the pump-light optical head 336 (FIG. 3) and the probe-light optical head 338 (FIG. 4) are separate components housed within the measuring head 102.

In an example, the optical elements 300 of the pump-light optics 314 and/or the probe-light optics 316 may include other optic mechanisms, such as additional lenses, additional mirrors, collimators, diffractive optical elements, polarizers, wave plates, crystals, or other suitable optics elements.

As illustrated in FIG. 6, in an example, the reflected portion of the probe light 114 is received at one end of the probe-light optical fiber 198 and is transmitted in a direction opposite to the transmission of the probe light 114. For example, a collimator 340 may be optically coupled on one end of the probe-light optical fiber 198 and an opposing end of the probe-light optical fiber 198 is optically coupled to the interferometer 186.

In an example, the probe-light optics 316 (FIGS. 4 and 6) exploit a confocal configuration for transmission of the probe light 114 and reception of the reflected portion of the probe light 114. This configuration enables the power collected back to the probe-light optical fiber 198 (e.g., an eight (8) micrometer core fiber) to be maximized. Thus, in order for the laser ultrasound testing operation performed using the system 100 to achieve results within an acceptable level of accuracy, the surface 202 of the structure 200 may need to be in focus of the probe light 114 and perpendicular to the probe light 114.

Generally, a probe-light spot (not explicitly shown) defined, or formed, by the probe light 114 (FIG. 4) has a probe-light spot size having dimensions due to diffraction. The probe-light spot size is determined by a numerical aperture of the probe-light lens 304 (e.g., numerical aperture of an aspheric lens). The surface 202 of the structure 200 may be located in focus of the probe-light lens 304 or may be slightly closer or further away. The distance where the power of the probe light 114 decreases by 1/e times relative to that of in focus determines the depth of field. The surface 202 of the structure 200 may also be angularly oriented (e.g., tilted) slightly from normal within the reception angle of probe light 114 and the probe-light lens 304 so that the reflected portion of the probe light 114 will return to a corresponding probe-light optical fiber 198 when the angle with respect to the surface 202 is less than the reception angle.

The numerical aperture (NA) can be expressed as: $NA=D/2f$; wherein D is the aperture of the lens and f is the focal length of the lens. The reception angle (RA) of the lens can be expressed as: $RA=\tan^{-1}(NA)$. The depth of field (DOF) can be expressed as: $DOF=\lambda/(NA)^2+d/NA$; wherein d is the maximum dimension of the spot (i.e., the spot size) and $\lambda$ is the wavelength of the light. In an example, the spot is circular and the maximum dimension of the spot is the diameter of the spot.

Thus, in an example, selective control of the probe-light focal depth 110 to locate and consistently maintain the probe-light focal point 124 on the surface 202 and/or selective control of the probe-light projection angle 118 to orient and consistently maintain the probe light 114 normal to the surface actively maintains a detection point of the probe light 114 on the surface 202 within the reception angle and the depth of field of the probe light 114.

Figure 7:
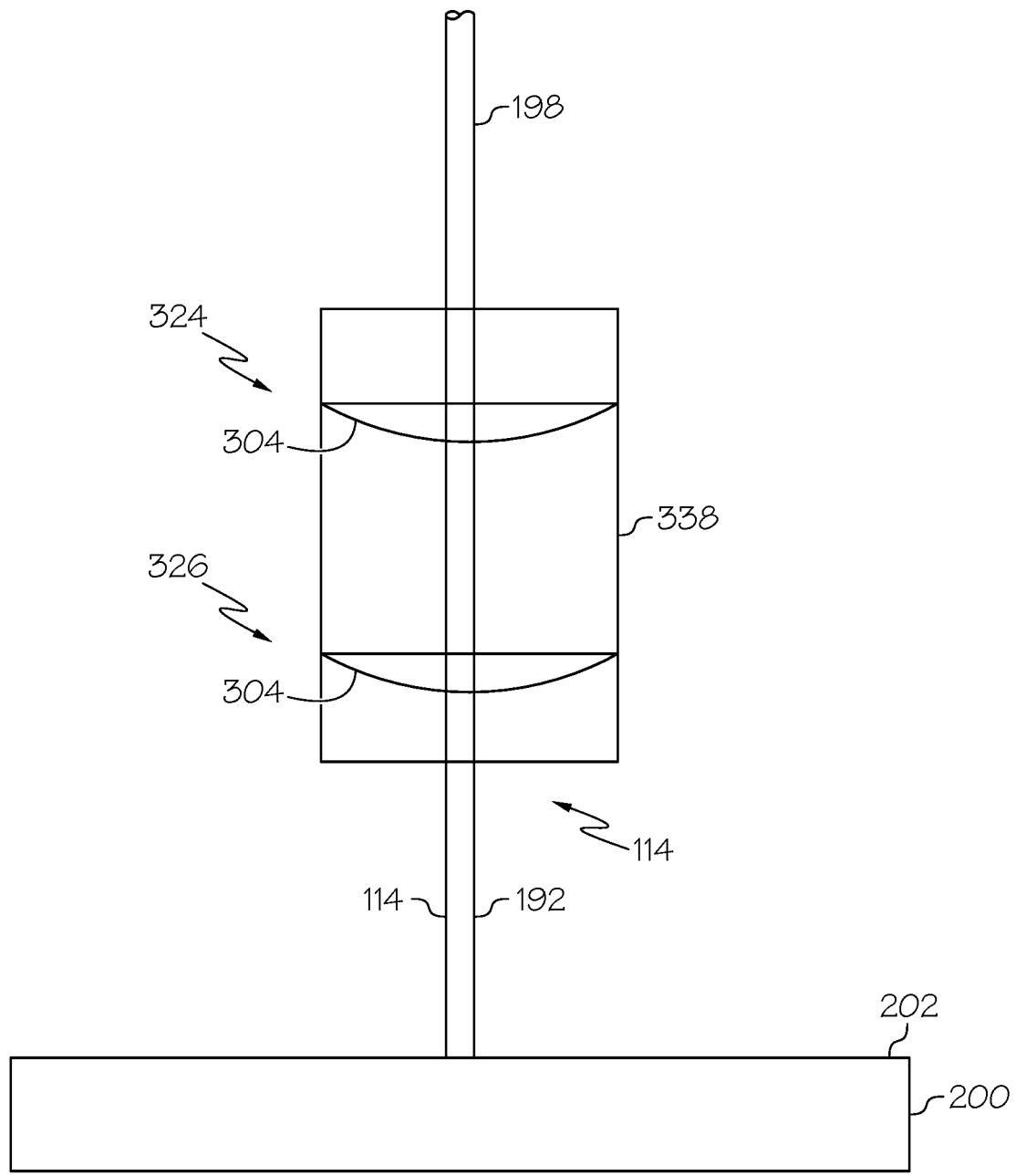
FIG. 7 is a schematic illustration of an example of a probe-light optical head of the laser ultrasound testing system depicting the probe light being transmitted on and reflected back from the surface of the structure.
Figure 8:
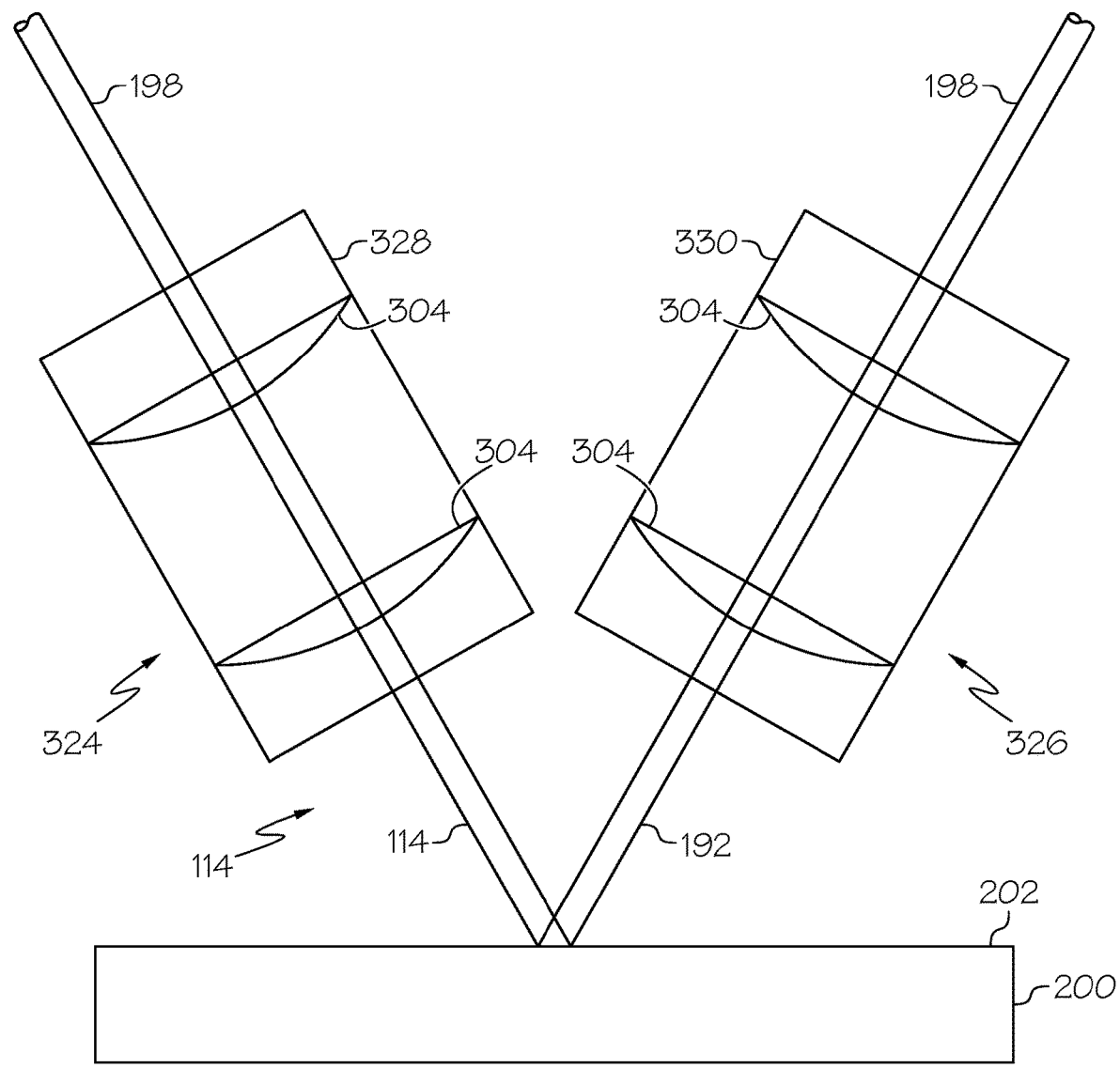
FIG. 8 is a schematic illustration of an example of two cooperating probe-light optical heads of the laser ultrasound testing system depicting the probe light being transmitted on and reflected back from the surface of the structure.

Referring to FIG. 7, in an example, system 100 utilizes one (1) probe-light optical head 338 (e.g., housed within the measuring head 102) (FIG. 1), in which the probe-light optical head 338 both transmits the probe light 114 onto the surface 202 and receives the reflected portion of the probe light 114 back from the surface 202. Referring to FIG. 8, in an example, the system 100 utilizes two (2) probe-light optical heads 338 (e.g., housed within the measuring head 102) (FIG. 1), in which one of the probe-light optical heads 338 transmits the probe light 114 onto the surface 202 and the other one of the probe-light optical heads 338 receives the reflected portion of the probe light 114 back from the surface 202. In either of these examples, the confocal geometry described above is maintained for the probe light 114 so that the detection point of the probe light 114 on the surface 202 is within the reception angle and the depth of field of the probe-light optics 316.

As illustrated in FIG. 7, in an example, the probe-light optics 316 are integrated into the probe-light optical head 338. A transmit portion 324 of the probe-light optics 316 (e.g., one or more of the optical elements 300 (FIG. 6), such as the probe-light lens 304) are housed within the probe-light optical head 338 and are configured for transmission of the probe light 114. A receive portion 326 of the probe-light optics 316 (e.g., one or more of the optical elements 300, such as the probe-light lens 304) are housed within the probe-light optical head 338 and are configured for reception of the reflected portion of the probe light 114 (i.e., the reflected-probe light 192).

Figure 9:
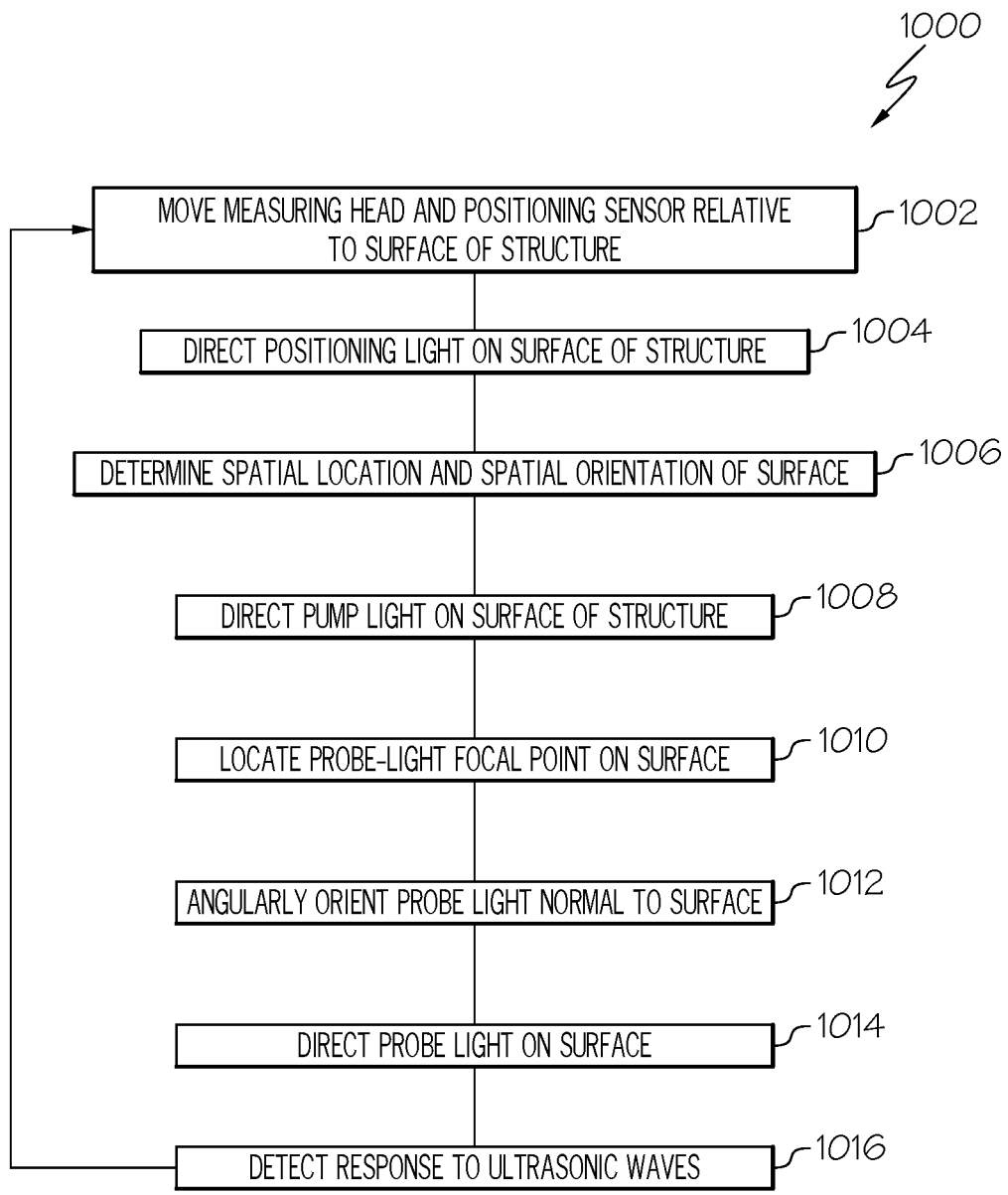
FIG. 9 is a flow diagram of an example of a method for testing a structure using laser ultrasound.

As illustrated in FIG. 8, in an example, the probe-light optics 316 are separated into two (2) probe-light optical heads 338, individually identified as a probe-light optical-transmit head 328 and a probe-light optical-receive head 330. The transmit portion 324 of the probe-light optics 316 (e.g., one or more of the optical elements 300 (FIG. 6), such as the probe-light lens 304) are housed within the probe-light optical-transmit head 328 and are configured for transmission of the probe light 114. The receive portion 326 of the probe-light optics 316 (e.g., one or more of the optical elements 300, such as the probe-light lens 304) are housed within the probe-light optical-receive head 330 and are configured for reception of the reflected portion of the probe light 114 (i.e., the reflected-probe light 192). FIG. 9 illustrates an example of a method 1000 for testing the structure 200 using laser ultrasound. In particular, one or more examples of the method 1000 includes a method for selectively controlling and consistently maintaining the probe-light focal point 124 of probe light 114 on the surface 202 and selectively controlling and consistently maintaining the probe light 114 oriented normal to the surface 202. Additionally, one or more examples of the method 1000 includes a method for controlling and consistently maintaining the pump light 112 at the predetermined orientation relative to the surface 202. In an example, implementation of the method 1000 is used to test the structure 200 using the disclosed system 100.

In an example, the method 1000 includes a step of moving (e.g., globally moving) the measuring head 102 and the positioning sensor 136 (FIGS. 1 and 2) into a predetermined spatial position relative to the surface 202 of the structure 200, such as relative to the area of interest 214 of the surface 202 (Block 1002).

In an example, the movement apparatus 120 (FIGS. 1 and 2) moves the measuring head 102 and the positioning sensor 136 into a starting spatial position relative to the surface 202, such as relative to the area of interest 214, for example, within a predefined movement envelope. With the in measuring head 102 and the positioning sensor 136 in the starting spatial position, the positioning sensor 136 evaluates the surface 202 to determine the spatial location 218 and the spatial orientation 220 of the area of interest 214.

The method 1000 includes a step of determining whether the probe light 114 directed onto the surface is properly configured so that the probe-light focal point 124 (FIG. 4) of the probe light 114 is located on the surface 202 and/or that the probe light 114 is angularly oriented normal to the surface 202. Such a determination may be based on an evaluation or a computational analysis of a combination of: the current probe-light focal depth 110 (FIG. 4) of the probe light 114; the current probe-light projection angle 118 (FIG. 4) of the probe light 114; the current spatial location of the probe-light optical output 132 (FIG. 4), or the spatial location of the optical output 126 of the measuring head 102 (FIG. 1); the current spatial orientation of the probe-light optical output 132 (FIG. 4), or the spatial location of the optical output 126 of the measuring head 102 (FIG. 1); the spatial location 218 of the area of interest 214 of the surface 202; and the spatial orientation 220 of the area of interest 214 of the surface 202.

The method 1000 may also include a step of determining whether the pump light 112 directed onto the surface 202 is properly configured so that the pump-light spot 318 (FIG. 3) has the desired pump-light spot size on the surface 202 and/or that the pump light 112 is properly angularly oriented at a desired orientation relative to the surface 202. In an example, such a determination is based on an evaluation or a computational analysis of a combination of: a current pump-light focal depth 146 (FIG. 3) of the pump light 112; the current pump-light projection angle 122 (FIG. 3) of the pump light 112; the current spatial location of the pump-light optical output 188 (FIG. 3), or the spatial location of the optical output 126 of the measuring head 102 (FIG. 1); the current spatial orientation of the pump-light optical output 188 (FIG. 4), or the spatial location of the optical output 126 of the measuring head 102 (FIG. 1); the spatial location 218 of the area of interest 214 of the surface 202; and the spatial orientation 220 of the area of interest 214 of the surface 202.

In an example, the method 1000 includes a step of directing the positioning light 104 (FIGS. 1, 2, and 5) onto the surface 202 of the structure 200, such as the area of interest 214 (Block 1004). The method 1000 further includes a step of determining the spatial location 218 and the spatial orientation 220 of the surface 202 from an evaluation of the positioning light 104 reflected from the surface 202 (Block 1006).

In an example, the method 1000 includes a step of directing the pump light 112 (FIGS. 1, 2, and 3) onto the surface 202 to generate the ultrasonic waves 204 (FIGS. 1, 3, and 4) in the structure 200 (Block 1008).

In an example, the method 1000 includes a step of defining the pump-light spot 318 (FIG. 3) on the surface 202 with the pump light 112 that has the pump-light spot size between one (1) millimeter and ten (10) millimeters, based on the spatial location 218 ascertained for the surface 202. In an example, the step of defining the pump-light spot 318 on the surface 202 includes at least one step of: selectively shaping the pump light 112; selectively adjusting the pump-light focal depth 146 (FIG. 3) of the pump light 112; and selectively adjusting the spatial location of the pump-light optical output 188 (FIG. 3) of the pump light 112 relative to the surface 202.

In an example, the method 1000 includes a step of selectively angularly orienting the pump light 112 (FIGS. 1, 2, and 3) at the predetermined (e.g., desired) angular orientation relative to the surface 202, based on the spatial orientation 220 ascertained for the surface 202. In an example, the step of selectively angularly orienting the pump light 112 at the predetermined angular orientation relative to the surface 202 includes a step of adjusting the pump-light projection angle 122 (FIG. 3) of the pump light 112. In an example, the step of selectively angularly orienting the pump light 112 at the predetermined angular orientation relative to the surface 202 includes a step of selectively adjusting the spatial orientation of the pump-light optical output 188 (FIG. 3) of the pump light 112 relative to the surface 202.

In an example, the method 1000 includes a step of selectively locating the probe-light focal point 124 (FIG. 4) of probe light 114 on the surface 202, based on the spatial location 218 determined for the surface 202 (Block 1010). The method 1000 also includes a step of selectively angularly orienting the probe light 114 normal to the surface 202, based on the spatial orientation 220 determined for the surface 202 (Block 1012).

In an example, the step of selectively locating the probe-light focal point 124 (FIG. 4) of probe light 114 on the surface 202 (Block 1010) includes a step of selectively adjusting the probe-light focal depth 110 of the probe light 114. In another example, the step of selectively locating the probe-light focal point 124 (FIG. 4) of probe light 114 on the surface 202 (Block 1010) includes a step of selectively adjusting the spatial location of the probe-light optical output 132 of the probe light 114 relative to the surface 202.

In an example, the step of selectively angularly orienting the probe light 114 normal to the surface 202 (Block 1012) includes a step of selectively adjusting the probe-light projection angle 118 of the probe light 114. In another example, the step of selectively angularly orienting the probe light 114 normal to the surface 202 (Block 1012) includes a step of selectively adjusting the spatial orientation of the probe-light optical output 132 of the probe light 114 relative to the surface 202.

In an example, the method 1000 includes a step of directing the probe light 114 (FIGS. 1, 2, and 4) onto the surface 202, such as the area of interest 214 (Block 1014). The probe light 114, directed onto the surface 202, is manipulated so that the probe-light focal point 124 is located on the surface 202 and the probe light 114 is oriented normal to the surface 202.

In an example, the method 1000 includes a step of detecting the response 206 (FIGS. 1 and 4) to the ultrasonic waves 204 (FIGS. 1, 3, and 4) (Block 1016). The method 1000 also includes a step of evaluating the response 206 to generate the information 212 about the structure 200 and a step of determining whether the anomaly 208 is present in the structure 200, based on the information 212 generated about the structure 200.

In an example, the step of moving the measuring head 102 and the positioning sensor 136 (FIGS. 1 and 2) relative to the surface 202 (Block 1002) includes a step of moving the measuring head 102 and the positioning sensor 136 over the surface 202 along the scan path 142 (FIG. 2). Moving the positioning sensor 136 over the surface 202 along the scan path 142 moves the positioning light 104 (FIGS. 1, 2, and 5) over the surface 202 along the scan path 142. Moving the positioning light 104 over the surface 202 along the scan path 142 enables the system 100, via analysis of the reflected portion of the positioning light 104, to ascertain the spatial location 218 and the spatial orientation 220 of each one of additional areas of interest 214 that reside, or are disposed, along the scan path 142. Moving the measuring head 102 over the surface 202 along the scan path 142 moves the pump light 112 (FIGS. 1, 2, and 3) and the probe light 114 (FIGS. 1, 2, and 4) over the surface 202 along the scan path 142. Moving the pump light 112 and the probe light 114 over the surface 202 along the scan path 142 enables the system 100, via generation of the ultrasonic waves 204 (FIGS. 1, 3, and 4) and analysis of the response (FIGS. 1 and 4), to characterize the structure 200 at each one of the additional areas of interest 214 that reside along the scan path 142.

The positioning light 104, the pump light 112, and the probe light 114 may be moved across the surface concurrently, such as by simultaneously moving the measuring head 102 (FIGS. 1-4) and the positioning sensor 136 (FIGS. 1, 2, and 5) with the movement apparatus 120 (FIGS. 1 and 2). Alternatively, movement of the positioning light 104 and movement of the pump light 112 and the probe light 114 may be performed sequentially.

In an example, the step of determining the spatial location 218 and the spatial orientation 220 of the surface 202 (Block 1006) includes a step of determining a change in at least one of the spatial location 218 and the spatial orientation 220 of the surface 202 along the scan path 142 (FIG. 2) from regular evaluation of the positioning light 104 (FIGS. 1, 2, and 5) reflected back from the surface 202 when moving the positioning light 104 over the surface 202.

In an example, the step of selectively locating the probe-light focal point 124 (FIG. 4) of probe light 114 (FIGS. 1, 2, and 4) on the surface 202 (Block 1010) includes a step of consistently maintaining the probe-light focal point 124 of the probe light 114 located on the surface 202, in response to the change in the spatial location 218 determined for the surface 202, when moving the probe light 114 over the surface 202. In an example, the step of consistently maintaining the probe-light focal point 124 of the probe light 114 located on the surface 202 includes a step of selectively adjusting the probe-light focal depth 110 (FIG. 4) of the probe light 114 when moving the probe light 114 over the surface 202. In an example, the step of consistently maintaining the probe-light focal point 124 of the probe light 114 located on the surface 202 includes a step of selectively adjusting the spatial location of a probe-light optical output 132 (FIG. 4) of the probe light 114 relative to the surface 202 when moving the probe light 114 over the surface 202

In an example, the step of selectively angularly orienting the probe light 114 (FIGS. 1, 2, and 4) normal to the surface 202 (Block 1012) includes a step of consistently maintaining the probe light 114 angularly oriented normal to the surface 202, in response to the change in the spatial orientation 220 determined for the surface 202, when moving the probe light 114 over the surface 202. In an example, the step of consistently maintaining the probe light 114 angularly oriented normal to the surface 202 includes a step of selectively adjusting the probe-light projection angle 118 (FIG. 4) of the probe light 114 when moving the probe light 114 over the surface 202. In an example, the step of consistently maintaining the probe light 114 angularly oriented normal to the surface 202 includes a step of selectively adjusting the spatial orientation of the probe-light optical output 132 (FIG. 4) of the probe light 114 relative to the surface 202 when moving the probe light 114 over the surface 202.

In an example, the step of defining the pump-light spot 318 (FIG. 3) on the surface 202 includes a step of consistently maintaining the pump-light spot 318, defined by the pump light 112, on the surface 202 that has the pump-light spot-size between one (1) millimeter and ten (10) millimeters, in response to the change in the spatial location 218 determined for the surface 202, when moving the pump light 112 over the surface 202.

In an example, the step of selectively angularly orienting the pump light 112 (FIGS. 1, 2, and 3) at the predetermined angular orientation relative to the surface 202 includes a step of consistently maintaining the pump light 112 angularly oriented at the predetermined angular orientation relative to the surface 202, in response to the change in the spatial orientation 220 determined for the surface 202, when moving the pump light 112 over the surface 202

In an example, the step of detecting the response 206 (FIGS. 1 and 4) to the ultrasonic waves 204 (FIGS. 1, 3, and 4) (Block 1016) includes a step of regularly analyzing the response 206 to evaluate properties, parameters, and/or characteristics of the structure 200 and determine whether any additional anomalies 208 are present in the structure 200 when the pump light 112 and the probe light 114 move over the surface 202 along the scan path 142.

Figure 10:
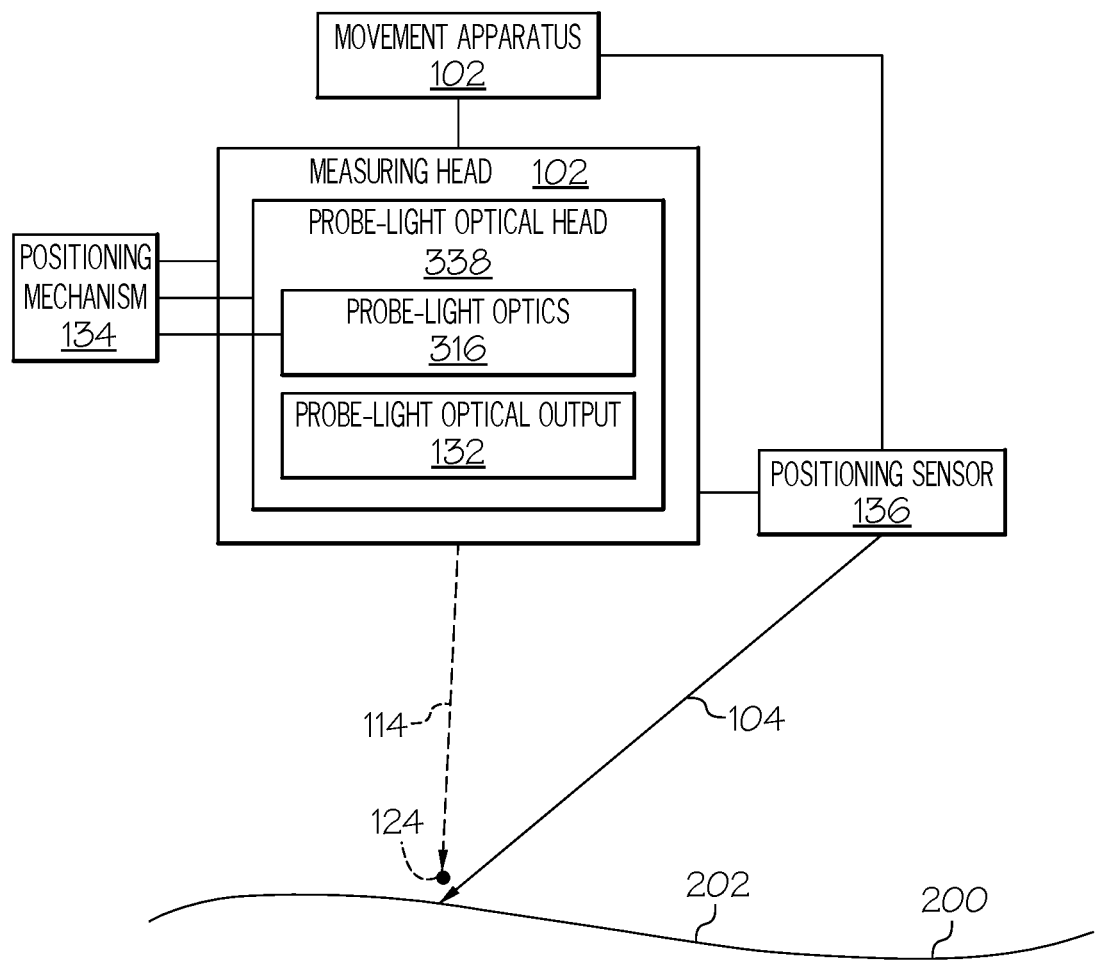
FIG. 10 is a schematic illustration of a portion of the laser ultrasound testing system depicting the positioning light being transmitted onto the surface of the structure during a portion of the disclosed method.
Figure 11:
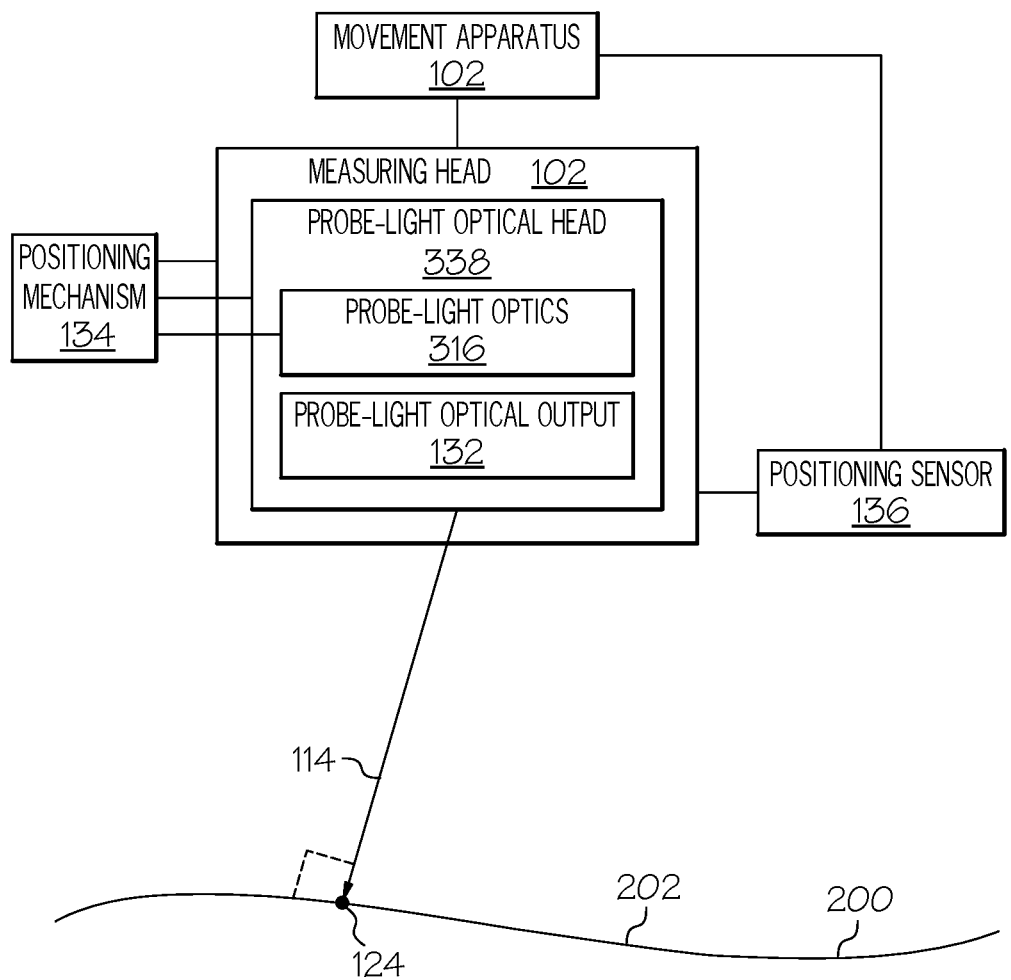
FIG. 11 is a schematic illustration of a portion of the laser ultrasound testing system depicting the probe light being transmitted onto the surface of the structure during a portion of the disclosed method.

FIGS. 10 and 11 illustrate portions of an example of the system 100 and, collectively, illustrate an example implementation of a portion of the steps according to the method 1000. As illustrated in FIG. 10, the positioning sensor 136 directs the positioning light 104 on the surface 202 to determine the spatial location 218 and the spatial orientation 220 (FIG. 1) of the surface 202, such as at the area of interest 214. Based on the positional feedback from the positioning sensor 136 (e.g., the determined spatial location 218 and the spatial orientation 220), it is determined that the probe light 114 (shown as a dashed line) is not properly configured to locate the probe-light focal point 124 on the surface 202 or orient the probe light 114 normal to the surface 202 for maximum light reception.

Therefore, as illustrated in FIG. 11, based on the positional feedback from the positioning sensor 136 (e.g., the determined spatial location 218 and the spatial orientation 220), the probe-light focal point 124 is selectively located on the surface 202 and the probe light 114 is oriented normal to the surface 202.

Selective location, or regular adjustment of the spatial location, of the probe-light focal point 124 to be located on the surface 202 is achieved by at least one of selectively adjusting the probe-light focal depth 110 (FIG. 4) of the probe light 114 and/or selectively adjusting the spatial location of the probe-light optical output 132 (FIG. 4) of the probe light 114 relative to the surface 202. For example, the probe-light focal depth 110 may be selectively located on the surface 202 by at least one of manipulating (e.g., adjusting the spatial location of) one or more of the probe-light optics 316 with the positioning mechanism 134, manipulating (e.g., adjusting the spatial location of) the probe-light optical head 338 relative to the surface 202 with the positioning mechanism 134, and/or manipulating (e.g., adjusting the spatial location of) the measuring head 102 relative to the surface 202 with the positioning mechanism 134.

Selective orientation, or regular adjustment of the spatial orientation, of the probe light 114 to be normal to the surface 202 is achieved by at least one of selectively adjusting the probe-light projection angle 118 (FIG. 4) and/or selectively adjusting the spatial orientation of the probe-light optical output 132 (FIG. 4) of the probe light 114 relative to the surface 202. For example, the probe light 114 may be selectively oriented normal to the surface 202 by at least one of manipulating (e.g., adjusting the spatial orientation of) one or more of the probe-light optics 316 with the positioning mechanism 134, manipulating (e.g., adjusting the spatial orientation of) the probe-light optical head 338 relative to the surface 202 with the positioning mechanism 134, and/or manipulating (e.g., adjusting the spatial orientation of) the measuring head 102 relative to the surface 202 with the positioning mechanism 134.

While not explicitly illustrated in FIGS. 10 and 11, in an example, the pump-light spot size of the pump-light spot 318 (FIG. 3) formed on the surface 202 may be selectively defined in a substantially similar way as described above with respect to selective adjustment of the location of the probe-light focal point 124 (FIG. 4). In an example, the pump light 112 (FIGS. 1, 2, and 3) may be selectively oriented at the predetermined orientation relative to the surface 202 in a substantially similar way as described above with respect to selective orientation of the probe light 114.

Accordingly, a particular benefit of the disclosed system 100 and method 1000 enables laser ultrasound testing to be performed on structures that have a variable geometry and/or variable surface contours. Such variations in geometry and/or surface contour are accounted for by adjusting the probe-light focal point 124 of the probe light 114 to be located on the surface 202 and adjusting the orientation of the probe light 114 to be normal to the surface 202, based on changes in the spatial location 218 and/or spatial orientation 220 determined for different areas of interest 214 along the scan path 142. Consistently maintaining the spatial location of the probe-light focal point 124 on the surface 202 and the spatial orientation of the probe light 114 normal to the surface 202 mitigate or eliminate the effect of such variations in geometry and/or surface contour on the accuracy of the response data 148 and/or information 212 characterizing the structure 200.

Referring to FIG. 1, in an example, the computer 138 and/or the control unit 152 is implemented using hardware, software, or a combination of hardware and software. When software is employed, a number of operations to be performed may be implemented in the form of program code or instructions stored on a computer readable storage medium (e.g., a non-transitory computer readable storage medium), such as memory 156 (e.g., a hard disk, a CD-ROM, solid state memory, or the like) of the computer 138, and configured to be executed by a processing unit 154 of the computer 138. The processing unit 154 may include, or take the form of, a number of processors. In an example, a corresponding processor implements or executes one of or a portion of the program instructions. In an example, a corresponding processor implements or executes a number of the program instructions.

When hardware is employed, the hardware may include circuits that operate to perform the operations. In some examples, hardware may take the form of a circuit system, an integrated circuit, an application specific integrated circuit (ASIC), a programmable logic device, or some other suitable type of hardware configured to perform a number of operations. With a programmable logic device, the device is configured to perform a number of operations. The device may be reconfigured at a later time or may be permanently configured to perform a number of operations. Examples of programmable logic devices include, for example, a programmable logic array, a programmable array logic, a field programmable logic array, a field programmable gate array (FPGA), and other suitable hardware devices.

In some examples, one or more operations performed by the system 100 and/or operational steps implemented by the method 1000, including, but not limited to, evaluation of the positioning data 166 (FIG. 1) to determine the spatial position (e.g., spatial location 218 and/or spatial orientation 220) of the area of interest 214 of the surface 202, adjustment of the spatial location of the probe-light focal point 124 (FIG. 4), adjustment of the spatial orientation of the probe light 114 (FIGS. 1, 2, and 4), adjustment of the pump-light spot size of the pump-light spot 318 (FIG. 3), adjustment of the spatial orientation of the pump light 112, movement of the measuring head 102 and the positioning sensor 136 (FIGS. 1-4) along the scan path 142 (FIG. 2), and/or evaluation of the response data 148 (FIG. 1) to generate the information 212 about the structure 200 is performed using a computer program product 158 executed by the computer 138.

The computer program product 158 includes computer code stored on the memory 156 and executable by the processing unit 154 to perform the operational steps discussed herein. Generally, the computer 138 provides an operating environment for execution of at least a portion of these operational steps. The computer 138 may include any collection of computing devices that individually or jointly execute a set (or multiple sets) of instructions to implement any one or more of the operations discussed herein. Any type of computer system or other apparatus adapted for carrying out the operations described herein may be utilized. A typical combination of hardware and software may be a general-purpose computer system. The general-purpose computer system may include computer programs, such as the computer program product 158, that control the computer 138 such that it carries out the operational steps described herein.

The computer-usable storage medium may include computer-usable program code embodied thereon. For the purpose of this disclosure, the term "computer program product" refers to a device including features enabling the implementation of the operations described herein. The terms computer program, software application, computer software routine, and/or other variants of these terms may mean any expression, in any language, code, or notation, of a set of instructions intended to cause a computing system having information processing capability to perform a particular function either directly or after either or both of the following: a) conversion to another language, code, or notation; or b) reproduction in a different material form. Instructions may be referred to as program code, computer usable program code, or computer readable program code that may be read and executed by the processing unit 154. The program code, in the different examples, may be embodied on different physical or computer readable storage media, such as the memory 156.

In some examples, the processing unit 154 is configured to execute program code or instructions stored on the memory 156 (e.g., internal memory, external memory, or a combination thereof). The processing unit 154 may take the form of any logic-processing unit, such as one or more of a central processing unit (CPU), a microprocessor, a digital signal processor (DSP), other suitable logic processors, or a combination thereof. The memory 156 may take the form of any data storage unit, such as one or more of read-only memory (ROM), random access memory (RAM), solid-state memory, a volatile or non-volatile storage device, other suitable data storage, or a combination thereof.

In an example, the computer 138 also includes number of input/output (I/O) devices 160 (FIG. 1). Examples of the I/O devices 160 include, but are not limited to, one or more of a keypad, a keyboard, a touch-sensitive display screen, a liquid crystal display (LCD) screen, a microphone, a speaker, a communication port, or any combination thereof. The computer 138 is configured to generate the information 212; for example, indicative whether a number of anomalies 208 are present in the structure 200. This information 212 may take a number of different forms, such as an alert, a report, an image, other suitable information, based on laser ultrasound testing of the structure 200, or a combination thereof.

The alert may indicate whether the anomaly 208 is present. The alert may be displayed on a display device coupled to the computer 138. The image may be displayed on the display device of the computer 138. The image may be an image of a portion of or all of the structure 200 with a graphical indicator when the anomaly 208 is present in the structure 200. The graphical indicator may be displayed at a location in the image corresponding to a location in the structure 200 where the anomaly 208 is detected. When the anomaly 208 is absent, the graphical indicator may be displayed to indicate an absence of the anomaly 208. The report may identify parameters, properties, and/or characteristics of the structure 200 and any anomalies 208 present in the structure 200. The report may also include other information, such as locations of anomalies, types of anomalies, sizes of anomalies, and other suitable types of information.

Figure 12:
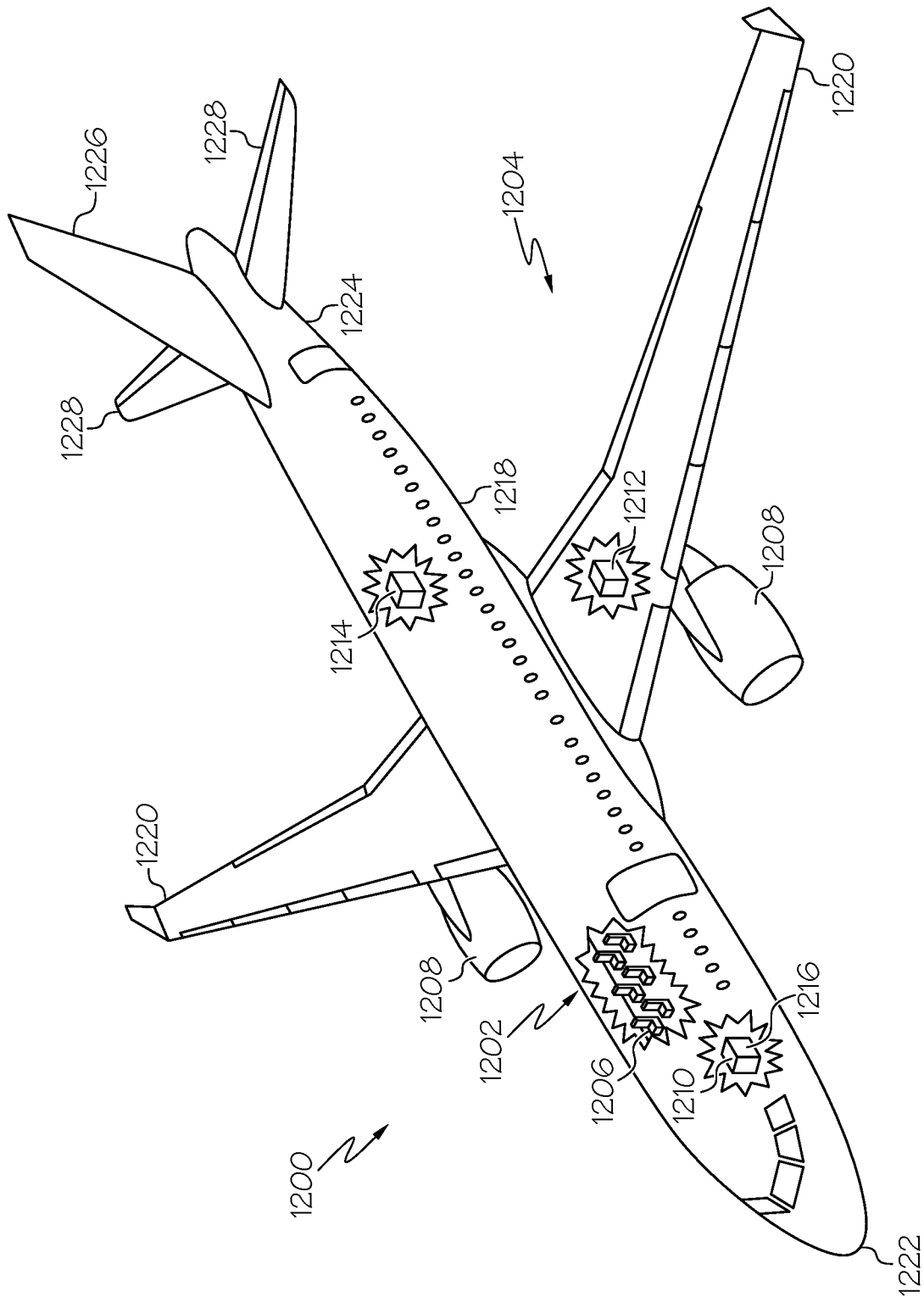
FIG. 12 is a schematic illustration of an example of an aircraft.
Figure 13:
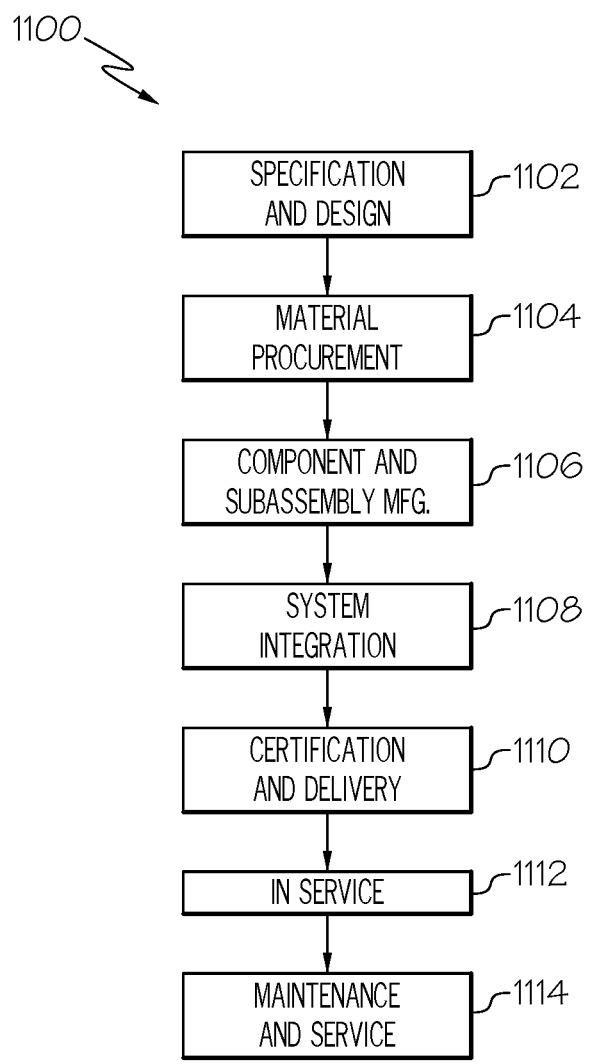
FIG. 13 is a flow diagram of an example aircraft production and service methodology.

Examples of the systems and methods disclosed herein may find use in a variety of potential applications, particularly in the transportation industry, including for example, aerospace applications. Referring now to FIGS. 12 and 13, examples of the systems and methods may be used in the context of an aircraft manufacturing and service method 1100, as shown in the flow diagram of FIG. 13 and an aircraft 1200, as shown in FIG. 12. Aircraft applications of the disclosed examples may include testing various structural components used in the manufacture of aircraft using laser ultrasound.

FIG. 12 is an illustrative example of an aircraft 1200. In the illustrative example, the aircraft 1200 is a fixed-wing aircraft. The aircraft 1200 includes an airframe 1202 and a plurality of high-level systems 1204 and an interior 1206. Examples of the high-level systems 1204 include one or more of a propulsion system 1208, an electrical system 1210, a hydraulic system 1212, an environmental system 1214 and a communications system 1216. In other examples, the aircraft 1200 may include any number of other types of systems.

The aircraft 1200 includes an airframe 1202. The airframe 1202 forms a fuselage 1218. The fuselage 1218 defines an interior 1206 of the aircraft 1200, which may include a passenger compartment and/or a cargo compartment. The fuselage 1218 is the main body of the aircraft 1200 and includes any suitable central structure configured to hold a crew, one or more passengers, and/or cargo. In the illustrative example, the fuselage 1218 is an elongate, generally cylindrical fuselage.

The fuselage 1218 includes a nose section 1222 at a forward end of the aircraft 1200 and a tail section 1224 at an aft end of the aircraft 1200. As used herein, the terms "forward" and "aft" have their ordinary meaning as known to those skilled in the art and refer to positions relative to a direction of movement of the aircraft 1200. The tail section 1224 also includes a vertical stabilizer 1226 and at least one horizontal stabilizer 1228.

The aircraft 1200 also includes a pair of wings 1220 (also referred to individually as wing 1220). Each one of the wings 1220 is coupled to the fuselage 1218. The wings 1220 include any suitable airfoil structures that are configured to provide lift to the aircraft 1200. In the illustrative example, the wings 1220 are elongated structures extending from a lower portion of the fuselage 1218 in a swept wing, tapered planform. In other examples, the wings 1220 are straight or delta-shaped. In still other examples, the wings 1220 are trapezoidal, constant, elliptical, semi-elliptical, or other configurations known in the art.

In the illustrative example, the propulsion system 1208 includes turbofan engines that are mounted to the wings 1220, for example, by pylons. In an example, each engine is housed in a nacelle, which includes an inlet and a nozzle. In other examples, the engines may be mounted to the fuselage 1218 or other aircraft structures, such as the tail section 1224. In various other examples, the propulsion system 1208 may include more or fewer engines and other types of engines (e.g., turboprop engines) may be used.

The aircraft 1200 may also include various flight control surfaces. The flight control surfaces include any aerodynamic device that is used to adjust and control flight and aerodynamic characteristics of the aircraft 1200. Examples of the flight control surfaces include flaps that are located on the trailing end of the wings 1220, elevators that are located on the trailing end of the horizontal stabilizers 1228, a rudder that is located on the trailing end of the vertical stabilizer 1226, and other control surfaces, such as leading end flaps, ailerons, and spoilers.

The aircraft 1200 includes various structural members that form the airframe 1202, the fuselage 1218, the wings 1220, the vertical stabilizer 1226, the horizontal stabilizer 1228, and other structures of the aircraft 1200. Examples of the structural members include skin panels, stringers, spars, ribs, frames, formers, and other types of parts. These structural members are coupled together by any one of various methods including, but not limited to, connection by various kinds of fasteners, co-curing, structurally bonding (e.g., adhesively bonding), or integrally forming.

The aircraft 1200 is an example of an aircraft having composite structures that may be inspected using laser ultrasound, such as with the disclosed system 100 in accordance with the disclosed method 1000. In some examples, the structure 200 is a part of (e.g., a structural member of) the aircraft 1200 or is a portion of a structural assembly of the aircraft 1200. In some examples, the structure 200 is a composite part of the aircraft 1200, such as the fuselage 1218, the wing 1220, the vertical stabilizer 1226, the horizontal stabilizer 1228, or another structure of the aircraft 1200. In some examples, the structure 200 is one or more composite structural members that form at least one of the fuselage 1218, the wing 1220, the vertical stabilizer 1226, the horizontal stabilizer 1228, or another structure of the aircraft 1200, such as a skin panel, a stringer, a spar, a rib, a wing box, a stiffener, or other types of parts.

As shown in FIG. 13, during pre-production, the illustrative method 1100 may include specification and design of aircraft 1200 (Block 1102) and material procurement (Block 1104). During production of the aircraft 1200, component and subassembly manufacturing (Block 1106) and system integration (Block 1108) of the aircraft 1200 may take place. Thereafter, the aircraft 1200 may go through certification and delivery (Block 1110) to be placed in service (Block 1112). The disclosed systems and methods may form a portion of component and subassembly manufacturing (Block 1106) and/or system integration (Block 1108). Routine maintenance and service (Block 1114) may include modification, reconfiguration, refurbishment, etc. of one or more systems of the aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the systems 100 and methods 1000 shown or described herein may be employed during any one or more of the stages of the manufacturing and service method 1100 shown in the flow diagram illustrated by FIG. 13. For example, components or subassemblies, such as those that include the structure 200, corresponding to component and subassembly manufacturing (Block 1106) may be fabricated or manufactured in a manner similar to components or subassemblies produced while the aircraft 1200 is in service (Block 1112). Also, one or more examples of the systems and methods disclosed herein may be utilized during production stages (Blocks 1108 and 1110). Similarly, one or more examples of the systems and methods disclosed herein may be utilized, for example and without limitation, while the aircraft 1200 is in service (Block 1112) and during maintenance and service stage (Block 1114).

Although an aerospace example is shown, the principles disclosed herein may be applied to other industries, such as the automotive industry, the space industry, the construction industry, and other design and manufacturing industries. Accordingly, in addition to aircraft, the principles disclosed herein may apply to other vehicle structures (e.g., land vehicles, marine vehicles, space vehicles, etc.) and standalone structures.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Unless otherwise indicated, the terms "first", "second", etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

For the purpose of this disclosure, the terms "coupled," "coupling," and similar terms refer to two or more elements that are joined, linked, fastened, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

In FIGS. 1, 3-5, 10, and 11, referred to above, the blocks may represent elements, components, and/or portions thereof and lines, if any, connecting various elements and/or components may represent mechanical, electrical, fluid, optical, electromagnetic and other couplings and/or combinations thereof. Couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples. Likewise, elements and/or components, if any, represented with dashed lines, indicate alternative examples. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1, 3-5, 10, and 11 may be combined in various ways without the need to include other features described in FIGS. 1, 3-5, 10, and 11, other drawing figures, and/or the accompanying disclosure, even though such combination or combinations are not explicitly illustrated herein. Similarly, additional features not limited to the examples presented, may be combined with some or all of the features shown and described herein.

In FIGS. 9 and 13, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 9 and 13 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Although various examples of the disclosed systems and methods have been shown and described, modifications may occur to those skilled in the art upon reading the specification. The present application includes such modifications and is limited only by the scope of the claims.

What is claimed is:

1. A method for testing a structure using laser ultrasound, the method comprising steps of:
   directing positioning light on a surface of the structure;
   determining a spatial location and a spatial orientation of the surface from an evaluation of the positioning light reflected back from the surface;
   directing pump light onto the surface to generate ultrasonic waves in the structure;
   selectively locating a probe-light focal point of probe light on the surface, based on the spatial location determined for the surface;
   selectively angularly orienting the probe light normal to the surface, based on the spatial orientation determined for the surface; and
   directing the probe light onto the surface to detect a response to the ultrasonic waves.

2. The method of claim 1, further comprising:
   evaluating the response to generate information about the structure; and
   determining whether an anomaly is present in the structure, based on the information generated about the structure.

3. The method of claim 1, wherein the step of selectively locating the probe-light focal point of the probe light on the surface comprises selectively adjusting a probe-light focal depth of the probe light.

4. The method of claim 1, wherein the step of selectively locating the probe-light focal point of the probe light on the surface comprises selectively adjusting a spatial location of a probe-light optical output of the probe light relative to the surface.

5. The method of claim 1, wherein the step of selectively angularly orienting the probe light normal to the surface comprises selectively adjusting a probe-light projection angle of the probe light.

6. The method of claim 1, wherein the step of selectively angularly orienting the probe light normal to the surface comprises selectively adjusting a spatial orientation of a probe-light optical output of the probe light relative to the surface.

7. The method of claim 1, further comprising a step of defining a pump-light spot on the surface with the pump light that has a pump-light spot size between one millimeter and ten millimeters, based on the spatial location determined for the surface.

8. The method of claim 7, wherein the step of defining the pump-light spot on the surface comprises at least one of selectively shaping the pump light, selectively adjusting a pump-light focal depth of the pump light, and selectively adjusting a spatial location of a pump-light optical output of the pump light relative to the surface.

9. The method of claim 1, further comprising a step of selectively angularly orienting the pump light at a predetermined angular orientation relative to the surface, based on the spatial orientation determined for the surface.

10. The method of claim 9, wherein the step of selectively angularly orienting the pump light at a predetermined angular orientation relative to the surface comprises adjusting a pump-light projection angle of the pump light.

11. The method of claim 9, wherein the step of selectively angularly orienting the pump light at a predetermined angular orientation relative to the surface comprises selectively adjusting a spatial orientation of a pump-light optical output of the pump light relative to the surface.

12. The method of claim 1, further comprising steps of:
moving the positioning light over the surface along a scan path;
moving the pump light and the probe light over the surface along the scan path;
determining a change in at least one of the spatial location and the spatial orientation of the surface along the scan path from regular evaluation of the positioning light reflected back from the surface when moving the positioning light over the surface;
consistently maintaining the probe-light focal point of the probe light located on the surface, in response to the change in the spatial location determined for the surface, when moving the probe light over the surface; and
consistently maintaining the probe light angularly oriented normal to the surface, in response to the change in the spatial orientation determined for the surface, when moving the probe light over the surface.

13. The method of claim 12, wherein the step of consistently maintaining the probe-light focal point of the probe light located on the surface comprises selectively adjusting a probe-light focal depth of the probe light when moving the probe light over the surface.

14. The method of claim 12, wherein the step of consistently maintaining the probe light angularly oriented normal to the surface comprises selectively adjusting a probe-light projection angle of the probe light when moving the probe light over the surface.

15. The method of claim 12, wherein the step of consistently maintaining the probe-light focal point of the probe light located on the surface comprises selectively adjusting a spatial location of a probe-light optical output of the probe light relative to the surface when moving the probe light over the surface.

16. The method of claim 12, wherein the step of consistently maintaining the probe light angularly oriented normal to the surface comprises selectively adjusting a spatial orientation of a probe-light optical output of the probe light relative to the surface.

17. The method of claim 12, further comprising consistently maintaining a spot, defined by the pump light, on the surface that has a spot-size between one millimeter and ten millimeters, in response to the change in the spatial location determined for the surface, when moving the pump light over the surface.

18. The method of claim 12, further comprising consistently maintaining the pump light angularly oriented at a predetermined angular orientation relative to the surface, in response to the change in the spatial orientation determined for the surface, when moving the pump light over the surface.

19. A method for testing a structure using laser ultrasound, the method comprising steps of:
directing positioning light on a surface of the structure;
determining a spatial location and a spatial orientation of the surface from an evaluation of the positioning light reflected back from the surface;
selectively angularly orienting pump light at a predetermined angular orientation relative to the surface, based on the spatial orientation determined for the surface;
directing the pump light onto the surface to form a pump-light spot having a predetermined pump-light spot size, based on the spatial location determined for the surface;
selectively locating a probe-light focal point of probe light on the surface, based on the spatial location determined for the surface;
selectively angularly orienting the probe light normal to the surface, based on the spatial orientation determined for the surface;
directing the probe light onto the surface;
generating ultrasonic waves in the structure with the pump light; and
detecting a response to the ultrasonic waves with the probe light.

20. The method of claim 19, wherein the pump-light spot size of the pump-light spot is between one millimeter and ten millimeters.

21. The method of claim 20, wherein the step of defining the pump-light spot on the surface comprises at least one of selectively shaping the pump light, selectively adjusting a pump-light focal depth of the pump light, and selectively adjusting a spatial location of a pump-light optical output of the pump light relative to the surface.

22. The method of claim 19, wherein the step of selectively locating the probe-light focal point of the probe light on the surface comprises at least one of selectively adjusting a probe-light focal depth of the probe light and selectively adjusting a spatial location of a probe-light optical output of the probe light relative to the surface.

23. The method of claim 19, wherein the step of selectively angularly orienting the probe light normal to the surface comprises at least one of selectively adjusting a probe-light projection angle of the probe light and selectively adjusting a spatial orientation of a probe-light optical output of the probe light relative to the surface.

24. The method of claim 19, wherein the step of selectively angularly orienting the pump light at a predetermined angular orientation relative to the surface comprises at least one of selectively adjusting a pump-light projection angle of the pump light and selectively adjusting a spatial orientation of a pump-light optical output of the pump light relative to the surface.

25. The method of claim 19, further comprising steps of:
moving the positioning light over the surface along a scan path;
moving the pump light and the probe light over the surface along the scan path;
determining a change in at least one of the spatial location and the spatial orientation of the surface along the scan path from regular evaluation of the positioning light reflected back from the surface when moving the positioning light over the surface;
consistently maintaining the pump light angularly oriented at the predetermined angular orientation relative to the surface, in response to the change in the spatial orientation determined for the surface, when moving the pump light over the surface;
consistently maintaining the pump-light spot having the predetermined pump-light spot size, in response to the change in the spatial location determined for the surface, when moving the pump light over the surface;
consistently maintaining the probe-light focal point of the probe light located on the surface, in response to the change in the spatial location determined for the surface, when moving the probe light over the surface; and
consistently maintaining the probe light angularly oriented normal to the surface, in response to the change in the spatial orientation determined for the surface, when moving the probe light over the surface.

26. A system for testing a structure using laser ultrasound, the system comprising:
a positioning sensor configured to transmit positioning light on a surface of the structure and to receive a portion of the positioning light reflected back from the surface, wherein a spatial location and a spatial orientation of the surface is determined, based on an evaluation of the portion of the positioning light reflected back from the surface;
a measuring head configured to transmit pump light and probe light onto the surface and to receive a portion of the probe light reflected back from the surface, wherein the pump light generates ultrasonic waves in the structure and the probe light detects a response to the ultrasonic waves; and
a positioning mechanism configured to:
selectively locate a probe-light focal point of the probe light on the surface, based on the spatial location determined for the surface; and
selectively angularly orient the probe light normal to the surface, based on the spatial orientation determined for the surface.

27. The system of claim 26, wherein the positioning mechanism is configured to selectively adjust a probe-light focal depth of the probe light to selectively locate the probe-light focal point of the probe light on the surface.

28. The system of claim 26, wherein the positioning mechanism is configured to selectively adjust a probe-light projection angle of the probe light to selectively angularly orient the probe light normal to the surface.

29. The system of claim 26, wherein:
the measuring head comprises a number of probe-light optics associated with the probe light;
the positioning mechanism manipulates one or more of the probe-light optics to selectively adjust a probe-light focal depth of the probe light so that the probe-light focal point of the probe light is located on the surface; and
the positioning mechanism manipulates one of more of the probe-light optics to selectively adjust a probe-light projection angle of the probe light so that the probe light is angularly oriented normal to the surface.

30. The system of claim 29, wherein selective adjustment of the probe-light focal depth and selective adjustment of the probe-light projection angle are performed concurrently.

31. The system of claim 29, wherein the positioning mechanism is configured to selectively adjust a spatial location of a probe-light optical output of the probe light relative to the surface to selectively locate the probe-light focal point of the probe light on the surface.

32. The system of claim 29, wherein the positioning mechanism is configured to selectively adjust a spatial orientation of a probe-light optical output of the probe light relative to the surface to selectively angularly orient the probe light normal to the surface.

33. The system of claim 29, wherein:
the measuring head comprises a probe-light optical head comprising a probe-light optical output of the probe light;
the positioning mechanism manipulates the probe-light optical head to selectively adjust the spatial location of the probe-light optical output relative to the surface so that the probe-light focal point of the probe light is located on the surface; and
the positioning mechanism manipulates the probe-light optical head to selectively adjust the spatial orientation of the probe-light optical output relative to the surface so that the probe light is angularly oriented normal to the surface.

34. The system of claim 33, wherein selective adjustment of the spatial location and selective adjustment of the spatial orientation of the probe-light optical head relative to the surface are performed concurrently.

35. The system of claim 29, wherein the pump light defines a spot on the surface that has a pump-light spot size between one millimeter and ten millimeters, based on the spatial location determined for the surface.

36. The system of claim 29, wherein the positioning mechanism is configured to selectively angularly orient the pump light at a predetermined angular orientation relative to the surface, based on the spatial orientation determined for the surface.

37. The system of claim 29, further comprising a movement apparatus configured to move the positioning sensor and the measuring head relative to the structure; and wherein the positioning mechanism is further configured to:
consistently maintain the probe-light focal point of the probe light located on the surface, in response to a change in the spatial location determined for the surface, when moving the probe light over the surface; and
consistently maintain the probe light angularly oriented normal to the surface, in response to a change in the spatial orientation determined for the surface, when moving the probe light over the surface.

38. The system of claim 29, wherein a probe-light projection angle of the probe light and a pump-light projection angle of the pump light are the same.

39. The system of claim 29, wherein a probe-light optical output associated with the probe light and a pump-light optical output associated with the pump light are the same optical output of the measuring head.

40. The system of claim 29, wherein a probe-light optical output associated with the probe light and a pump-light optical output associated with the pump light are different optical outputs of the measuring head.

41. A system for testing a structure using laser ultrasound, the system comprising:
- a positioning sensor configured to transmit positioning light on a surface of the structure and to receive a portion of the positioning light reflected back from the surface, wherein a spatial location and a spatial orientation of the surface is determined, based on an evaluation of the portion of the positioning light reflected back from the surface;
- a measuring head configured to transmit pump light and probe light onto the surface and to receive a portion of the probe light reflected back from the surface, wherein the pump light generates ultrasonic waves in the structure and the probe light detects a response to the ultrasonic waves; and
- a positioning mechanism configured to:
  - selectively angularly orient the pump light at a predetermined angular orientation relative to the surface, based on the spatial orientation determined for the surface, wherein the pump light defines a pump-light spot on the surface having a predetermined pump-light spot size;
  - selectively locate a probe-light focal point of the probe light on the surface, based on the spatial location determined for the surface; and
  - selectively angularly orient the probe light normal to the surface, based on the spatial orientation determined for the surface.

42. The system of claim 41, wherein the pump-light spot size of the pump-light spot is between one millimeter and ten millimeters.

43. The system of claim 41, wherein the positioning mechanism is configured to at least one of selectively adjust a probe-light focal depth of the probe light to selectively locate the probe-light focal point of the probe light on the surface and selectively adjust a probe-light projection angle of the probe light to selectively angularly orient the probe light normal to the surface.

44. The system of claim 41, wherein the positioning mechanism is configured to at least one of selectively adjust a spatial location of a probe-light optical output of the probe light relative to the surface to selectively locate the probe-light focal point of the probe light on the surface and selectively adjust a spatial orientation of the probe-light optical output of the probe light relative to the surface to selectively angularly orient the probe light normal to the surface.

45. The system of claim 41, further comprising a movement apparatus configured to move the positioning sensor and the measuring head relative to the structure; and wherein the positioning mechanism is further configured to:
- consistently maintain the pump light angularly oriented at the predetermined angular orientation relative to the surface, in response to a change in the spatial orientation determined for the surface, when moving the pump light over the surface;
- consistently maintain the pump-light spot on the surface having the predetermined pump-light spot size, in response to a change in the spatial location determined for the surface, when moving the pump light over the surface;
- consistently maintain the probe-light focal point of the probe light located on the surface, in response to the change in the spatial location determined for the surface, when moving the probe light over the surface; and
- consistently maintain the probe light angularly oriented normal to the surface, in response to the change in the spatial orientation determined for the surface, when moving the probe light over the surface.

\* \* \* \* \*